US012597806B2

(12) United States Patent
Kanakasabai et al.

(10) Patent No.: US 12,597,806 B2
(45) Date of Patent: Apr. 7, 2026

(54) POWER SOURCE SELECTION AND CONTROL IN AN APPARATUS

(71) Applicant: GE Intellectual Property Licensing, LLC, Niskayuna, NY (US)

(72) Inventors: Viswanathan Kanakasabai, Bangalore (IN); Jayanti Ganesh, Bangalore (IN); Subbarao Tatikonda, Bangalore (IN); Suma Memana Narayana Bhat, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 0 days.

(21) Appl. No.: 18/861,363

(22) PCT Filed: May 2, 2023

(86) PCT No.: PCT/US2023/066476
§ 371 (c)(1),
(2) Date: Oct. 29, 2024

(87) PCT Pub. No.: WO2023/215730
PCT Pub. Date: Nov. 9, 2023

(65) Prior Publication Data
US 2025/0293547 A1 Sep. 18, 2025

(30) Foreign Application Priority Data
May 3, 2022 (IN) .............................. 202211025745

(51) Int. Cl.
*H02J 50/12* (2016.01)
*H02J 50/00* (2016.01)
(Continued)

(52) U.S. Cl.
CPC ............ *H02J 50/12* (2016.02); *H02J 50/001* (2020.01); *H02J 50/80* (2016.02); *H05B 6/06* (2013.01)

(58) Field of Classification Search
CPC .......... H02J 50/001; H02J 50/12; H02J 50/80; H05B 6/06; H05B 1/00
See application file for complete search history.

(56) References Cited

U.S. PATENT DOCUMENTS

| | | | |
|---|---|---|---|
| 11,064,833 B2 * | 7/2021 | Cheng | ....................... A23L 5/13 |
| 2013/0076155 A1 * | 3/2013 | Yu | ........................... H02J 50/12 |
| | | | 307/104 |

(Continued)

FOREIGN PATENT DOCUMENTS

| | | |
|---|---|---|
| WO | 2020086507 | 4/2020 |
| WO | 2023215730 | 11/2023 |

OTHER PUBLICATIONS

"PCT Application No. PCT/US23/66476 International Search Report and Written Opinion", Sep. 22, 2023, 14 pages.

*Primary Examiner* — Rexford N Barnie
*Assistant Examiner* — Joseph N Inge
(74) *Attorney, Agent, or Firm* — DeLizio, Peacock, Lewin & Guerra, LLP

(57) ABSTRACT

This disclosure provides systems, methods and apparatuses for selectively utilizing wired power or wireless power in an apparatus. The apparatus may include a wired power circuit associated with the wired power and a wireless power circuit configured to receive wireless power from a wireless power transmitter. The apparatus may include a power source switch configured to selectively couple a load to the wired power circuit or the wireless power circuit. A controller may control the power source switch based on availability of the wired power or the wireless power. In some implementations, the load includes a heating element and a temperature (Continued)

switch. The controller also may control a wireless power transfer state of the wireless power transmitter based on a status of the temperature switch.

23 Claims, 11 Drawing Sheets

(51) Int. Cl.
  *H02J 50/80*    (2016.01)
  *H05B 6/06*    (2006.01)

(56)      References Cited

U.S. PATENT DOCUMENTS

| | | | |
|---|---|---|---|
| 2014/0009120 A1 | 1/2014 | Kim | |
| 2014/0184171 A1* | 7/2014 | Lee | H02J 50/10 |
| | | | 320/138 |
| 2014/0292101 A1* | 10/2014 | Baarman | H05B 6/06 |
| | | | 307/104 |
| 2019/0013687 A1* | 1/2019 | Shevde | H02J 50/00 |

* cited by examiner

Figure 3:
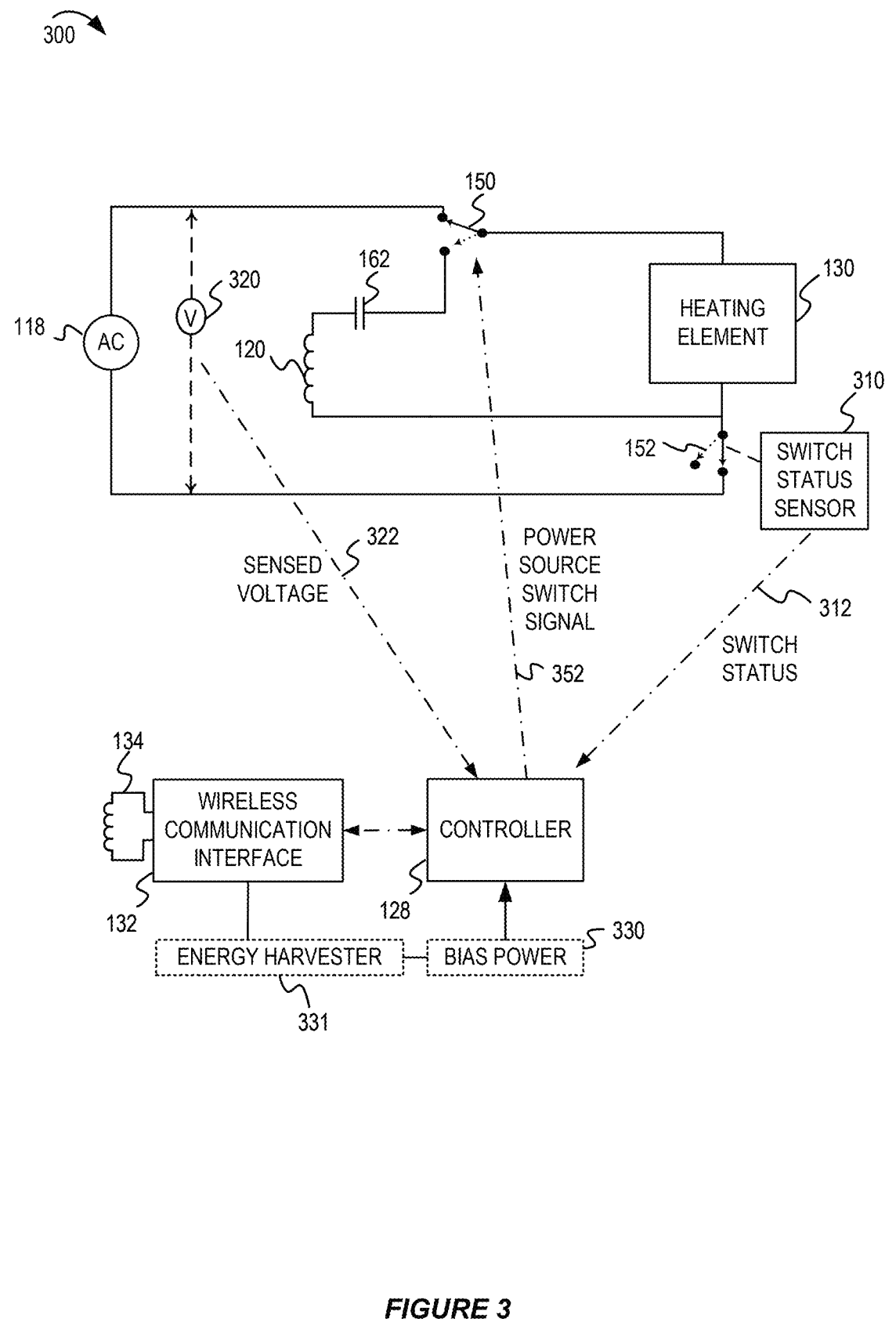

300

150

162

320

118   AC

120

130

HEATING
ELEMENT

310

152

SWITCH
STATUS
SENSOR

322

SENSED
VOLTAGE

POWER
SOURCE
SWITCH
SIGNAL

312

SWITCH
STATUS

352

134

WIRELESS
COMMUNICATION
INTERFACE

CONTROLLER

132

128

330

ENERGY HARVESTER

BIAS POWER

HEATING
ELEMENT

310

152

SWITCH
STATUS
SENSOR

610

322

Vsense

615

BIAS

642

630

+

COMP

644

Vth

650

HIGH WHEN
Vsense > Vth

WIRED POWER
INDICATOR

134

WIRELESS
COMMUNICATION
INTERFACE

CONTROLLER

680

132

331

330

128

ENERGY
HARVESTER

BIAS
POWER

Figure 7A:
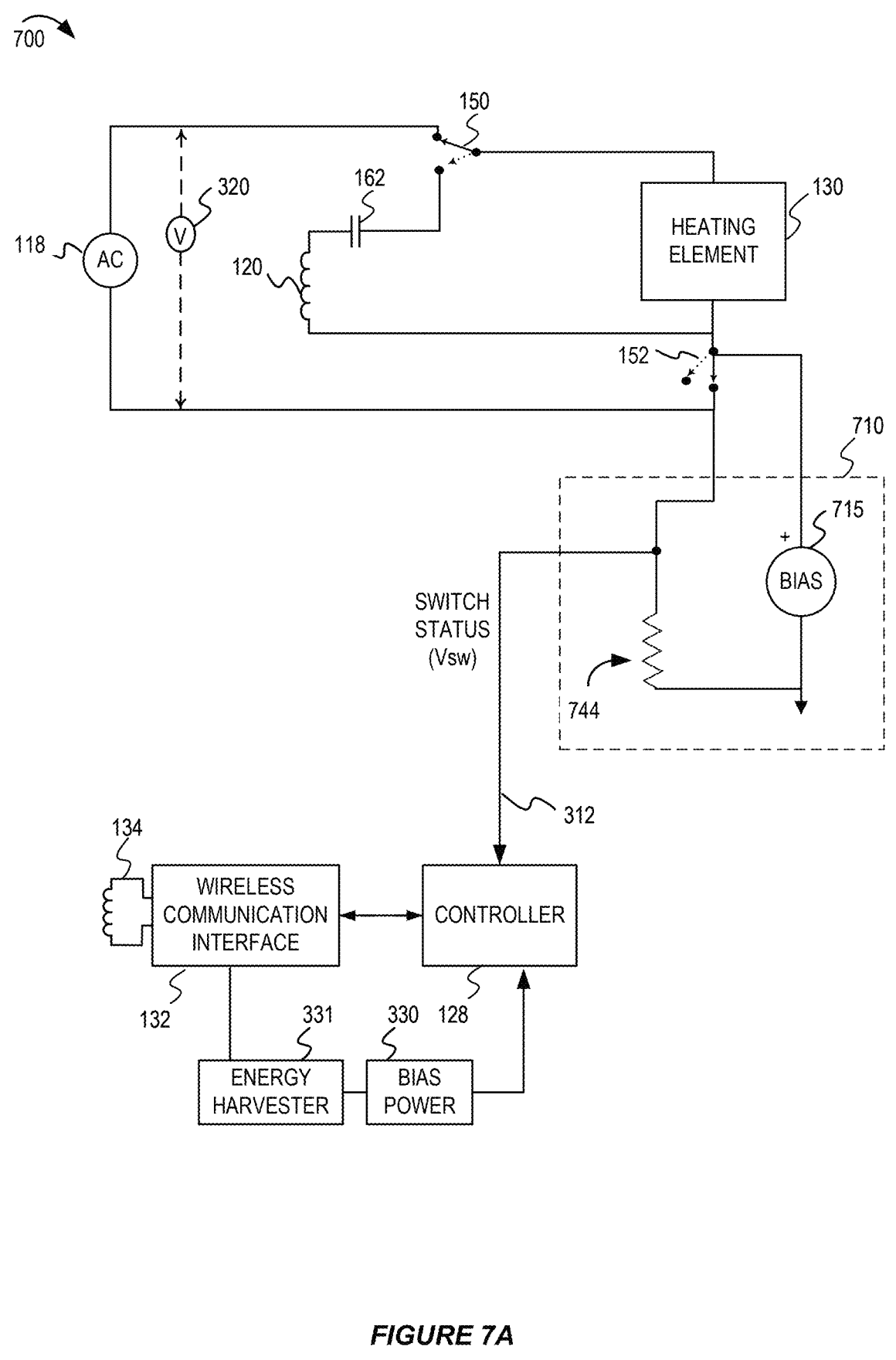

700

150

320

162

118  AC    V

120

130

HEATING
ELEMENT

152

710

715

+

BIAS

SWITCH
STATUS
(Vsw)

744

312

134

WIRELESS
COMMUNICATION
INTERFACE

CONTROLLER

132

331    330    128

ENERGY
HARVESTER

BIAS
POWER

HEATING
ELEMENT

120

152

711

774

815
715

BIAS 746      747

775

SWITCH
STATUS
(Vsw)   312

134

WIRELESS
COMMUNICATION
INTERFACE

CONTROLLER

132

331      330      128

ENERGY
HARVESTER

BIAS
POWER

1100

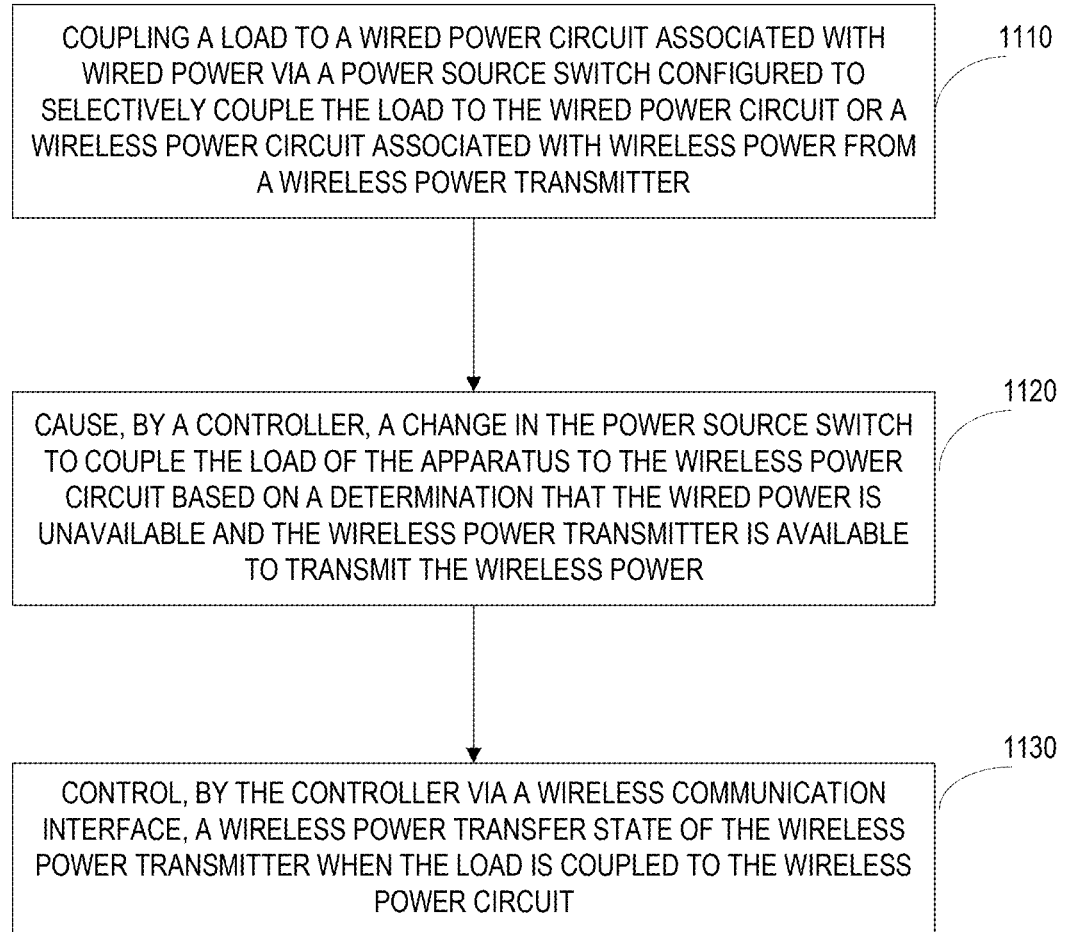

COUPLING A LOAD TO A WIRED POWER CIRCUIT ASSOCIATED WITH WIRED POWER VIA A POWER SOURCE SWITCH CONFIGURED TO SELECTIVELY COUPLE THE LOAD TO THE WIRED POWER CIRCUIT OR A WIRELESS POWER CIRCUIT ASSOCIATED WITH WIRELESS POWER FROM A WIRELESS POWER TRANSMITTER — 1110

CAUSE, BY A CONTROLLER, A CHANGE IN THE POWER SOURCE SWITCH TO COUPLE THE LOAD OF THE APPARATUS TO THE WIRELESS POWER CIRCUIT BASED ON A DETERMINATION THAT THE WIRED POWER IS UNAVAILABLE AND THE WIRELESS POWER TRANSMITTER IS AVAILABLE TO TRANSMIT THE WIRELESS POWER — 1120

CONTROL, BY THE CONTROLLER VIA A WIRELESS COMMUNICATION INTERFACE, A WIRELESS POWER TRANSFER STATE OF THE WIRELESS POWER TRANSMITTER WHEN THE LOAD IS COUPLED TO THE WIRELESS POWER CIRCUIT — 1130

*FIGURE 11*

POWER SOURCE SELECTION AND CONTROL IN AN APPARATUS

CROSS-REFERENCE TO RELATED APPLICATIONS

This Patent Application is a National Stage of International Application No. PCT/US23/66476, filed May 2, 2023, and claims the benefit of priority to India Non-Provisional patent application No. 202211025745, filed May 3, 2022, assigned to the assignee hereof, the disclosures of which are incorporated by reference in this Patent Application.

TECHNICAL FIELD

This disclosure relates generally to power source selection and control in an apparatus and, in some implementations, to an apparatus having a heating element that can be selectively powered by wired power or wireless power.

DESCRIPTION OF RELATED TECHNOLOGY

Some kitchen appliances (such as kettles or slow cookers) are intended to be used with an external heat source. Recent technology has been developed to enable such appliances to include an internal heating element powered by electricity. For example, a plug-in kettle may include a heating element powered by a wired connection between the plug-in kettle and a wired power source. The heating element may include a resistance component contained within the appliance. When electricity is applied to the resistance component, the heating element may generate heat. Examples of such appliances may include kettles, slow cookers, coffee machines, steamers, toasters, or broilers, among other examples. While some plug-in electric appliances are available in the marketplace, there is a desire to improve portability and interoperability of electric kitchen appliances.

In another technical field, technology has been developed to enable wireless power transfer to electronic devices (such as mobile devices, computers, tablets, gadgets, or the like). Wireless power transfer also may be referred to as a contactless power transmission or a non-contact power transmission. The wireless power may be transferred using inductive coupling or resonant coupling between a primary coil of a wireless power transmitter and a secondary coil of a wireless power receiver. For example, the primary coil of the wireless power transmitter may produce an electromagnetic field that induces an electromotive force in the secondary coil of the wireless power receiver when the secondary coil is placed in proximity to the primary coil. The electromagnetic force in the secondary coil may generate wireless power to operate or charge the electronic device.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented as an apparatus. The apparatus may include a power source switch configured to selectively couple a load to a wired power circuit associated with wired power or a wireless power circuit configured to receive wireless power from a wireless power transmitter. A controller of the apparatus may be configured to cause the power source switch to couple the load to the wireless power circuit based on a determination that the wired power is unavailable and the wireless power transmitter is available to transmit the wireless power. The controller may control a wireless power transfer state of the wireless power transmitter when the load is coupled to the wireless power circuit.

In some implementations, the apparatus may include a wireless communication interface configured to communicate with the wireless power transmitter. The controller may be configured to communicate with the wireless power transmitter via the wireless communication interface to control the wireless power transfer state of the wireless power transmitter.

In some implementations, the apparatus may include an energy harvester that is integrated with or operatively coupled to the wireless communication interface. The energy harvester may be configured to harvest a bias power from communication signals received by a communication coil of the wireless communication interface. The controller may be at least initially powered by the bias power.

In some implementations, the load may include a heating element and the apparatus may include a temperature switch associated with the load. The controller may be configured to control the wireless power transfer state of the wireless power transmitter based, at least in part, on a status of the temperature switch.

Another innovative aspect of the subject matter described in this disclosure can be implemented as a method. The method may include coupling a load to a wired power circuit associated with wired power via a power source switch configured to selectively couple the load to the wired power circuit or a wireless power circuit associated with wireless power from a wireless power transmitter. The method may include causing, by a controller, a change in the power source switch to couple the load to the wireless power circuit based on a determination that the wired power is unavailable and the wireless power transmitter is available to transmit the wireless power. The method may include controlling, by the controller via a wireless communication interface, a wireless power transfer state of the wireless power transmitter when the load is coupled to the wireless power circuit.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

FIG. 3 shows a block diagram of an example apparatus capable of utilizing wired power or wireless power.

FIG. 7A shows a block diagram of an example apparatus and an example switch status sensor.

FIG. 11 shows a flowchart diagram of an example process in accordance with some implementations.

Like reference numbers and designations in the various drawings indicate like elements.

DETAILED DESCRIPTION

Figure 1:
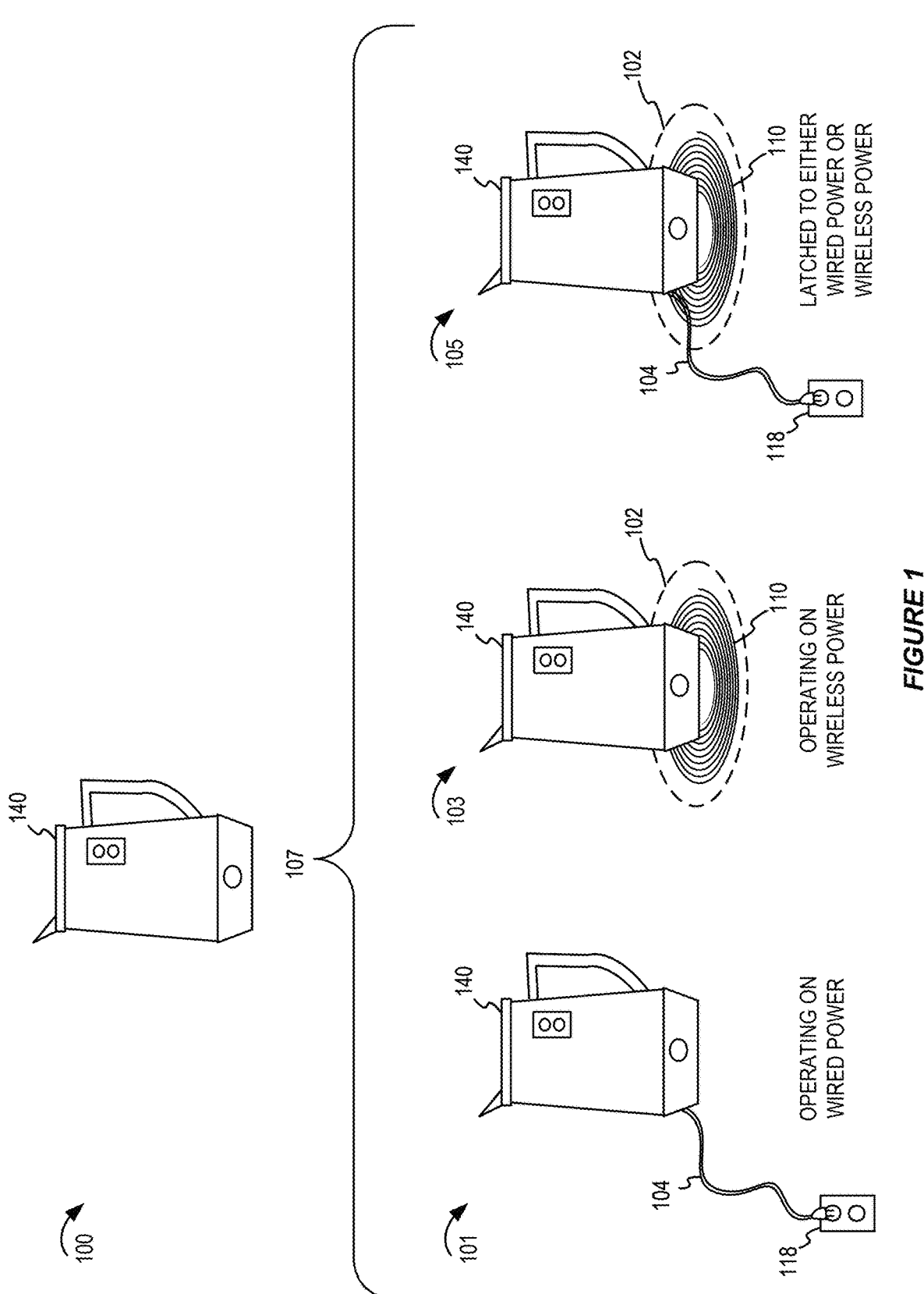
FIG. 1 shows a conceptual illustration of an apparatus capable of utilizing wired power or wireless power.

A traditional apparatus may be configured to use a wired power source (such as a plug-in electrical connection) to operate a load or other component. Technology is advancing rapidly such that an apparatus may be capable of operating using wireless power. Some types of apparatuses (sometimes referred to as a hybrid power device) may be capable of using both wired power and/or wireless power. Examples of such apparatuses may include kitchen appliances or other consumer electronics. Wireless power has become relatively common in consumer electronics (such as mobile devices or smartphones, among other examples). Wireless power transfer typically involves a wireless power transmitter (PTx) and a wireless power receiver (PRx). A PTx may include one or more primary coils that transmit wireless energy (as a wireless power signal) to one or more corresponding secondary coils in the PRx. A primary coil refers to a source of wireless energy (such as inductive or magnetic resonant energy producing an electromagnetic field) in the wireless power transmitter. An apparatus may include a PRx and other components. The secondary coil in the PRx may receive the wireless energy via the electromagnetic field and provide the wireless energy as power for the other components of the apparatus.

Wireless power transfer capability is being developed for use in kitchen applications. For example, some types of kitchen appliances may be intended to operate on a wireless power transmitting surface configured with one or more primary coils. As an example, a kitchen countertop or stovetop (sometimes referred to as a cooktop or a hob) may include one or more induction coils. An induction coil may be operated as a burner for heating a kitchen gadget or may be operated as a primary coil for wireless power transfer to a cordless kitchen appliance. As another example, a PTx may be embedded or added to a countertop, table, or other surface on which a cordless kitchen appliance may be placed. The cordless kitchen appliance is an example of an apparatus that may include a PRx capable of receiving wireless power and providing the wireless power to a load in the cordless kitchen appliance. The load may include a motor, a heating element, a timer, a screen, or a combination thereof, among other examples.

An apparatus may be capable of using wired power or wireless power. In an example apparatus for use in a kitchen, the apparatus may include a heating element for heating a liquid or food. For example, the apparatus may be a kettle, a slow cooker, a coffee machine, a steamer, a toaster, or a broiler, or an air fryer among other examples. The However, an apparatus that includes a heating element may require power control systems that differ from other hybrid power devices. Specifically, the heating element may be associated with a temperature switch and circuitry for managing power delivery to the heating element when used with wired power. The temperature switch may be used to protect the heating element from an overpower condition or may be used to control an amount of heat generated by the heating element. When wireless power is introduced as an optional power source, the apparatus may similarly benefit from control and protective features that depend on the temperature switch.

This disclosure provides systems, methods and apparatuses for selectively utilizing wired power or wireless power in an apparatus. The apparatus may include a wired power circuit associated with the wired power and a wireless power circuit configured to receive wireless power from a wireless power transmitter. The apparatus may include a power source switch configured to selectively couple a load (such as a heating element) to the wired power circuit or the wireless power circuit. A controller may control the power source switch based on availability of the wired power or the wireless power. In some implementations, the load includes a heating element. The controller also may control a wireless power transfer state of the wireless power transmitter based on a status of a temperature switch (such as a bimetallic switch) associated with the heating element.

In some implementations, the power source switch may be set to couple the load to the wired power by default. For example, the power source switch may be normally closed (NC) to a connector associate with a wired power circuit. The power source switch may be changed to a wireless power circuit based on a power source switch signal from a controller. The controller may be activated by a presence of a PTx. For example, the controller may be operated by a bias power that is harvested from a communication signal received from the PTx. In the absence of the PTx, the controller may remain dormant and thus does not cause the power source switch to change to the wireless power circuit. In some implementations, the controller is powered exclusively by the wireless power. In some implementations, the controller may be powered using energy drawn from the wired power circuit, energy harvested from a communication coil of the wireless communication interface, energy tapped from the secondary coil of the PRx, or any combination thereof. Furthermore, even when the wireless power is available, the controller may determine whether to cause the power source switch to change to the wireless power circuit based on whether the wired power is available. The controller may determine whether the wired power is available based on a voltage sensor associated with the wired power circuit.

In some implementations, a temperature switch may be part of the wired power circuit. For example, in some implementations, the temperature switch is a spring loaded switch and is operated by the user to initiate the powering or heating in the apparatus. The temperature switch may be configured to open the wired power circuit to disconnect a heating element (as the load) when a temperature of the heating element reaches a temperature threshold. This causes the cessation of heating in the apparatus. For example, the temperature switch may include a bimetallic element that warps based on temperature. When the bimetallic element warps a sufficient amount, the bimetallic element may mechanically open the wired power circuit to disconnect wired power from the heating element. In some implementations, when operated from wired power source, the current from the wired power source responsible for heating in the heating element flows through the contact made by the temperature switch and the heating element. However, when operated from wireless power source, wireless power circuit may bypass the temperature switch and the current from the wireless power source responsible for heating in the heating element does not flow though the contact made by the temperature switch. When using power from the wired power source, the power from the source is stopped when the temperature switch opens the wired power circuit. When using power drawn from wireless power source, a controller may obtain a status of the temperature switch and manage wireless power operations based on the status of the temperature switch. For example, the controller may cause a PTx to cease wired power transfer when the status of the temperature switch is indicative that the bimetallic switch has warped a sufficient amount. The controller may determine the status of the temperature switch using a switch status sensor.

In some implementations, the voltage sensor, the switch status sensor, or both, may be realized using one or more analog circuits. Thus, the wireless power capability may be added to the apparatus with less complex or costly components. This disclosure includes example analog circuits for implementing the voltage sensor or the switch status sensor.

In some implementations, the techniques of this disclosure can prevent a dangerous condition associated with fire, overheating, or electrical damage to components of the apparatus. Furthermore, in some implementations, the apparatus is configured to utilize only a single power source (wired power or wireless power) at a time. The techniques and example apparatuses described herein may adapt to changes in availability of different power sources. For example, the techniques in this disclosure may handle a situation where an appliance is placed on a wireless power source while it is plugged in to a wired power source, and vice versa. The techniques also handle situations where a power source is removed during wired power operation or wireless power operation.

Particular implementations of the subject matter described in this disclosure can be implemented to realize one or more of the following potential advantages. A hybrid power apparatus may support both wired power and wireless power options. The apparatus may include traditional components for wired power with a load while adding wireless power as an alternative option to power the load. In some implementations, the load may include a heating element traditionally controlled by a temperature switch in a wired power circuit. In some implementations, the techniques of this disclosure enable a controller to control the wireless power transfer based on a status of the temperature switch, even in implementations in which the wireless power circuit bypasses the temperature switch.

The following description is directed to certain implementations for the purposes of describing innovative aspects of this disclosure. For example, this disclosure describes an apparatus with a heating element and a temperature switch. However, a person having ordinary skill in the art will readily recognize that the teachings herein can be applied in a multitude of different ways. The described implementations can be implemented in any means, apparatus, system, or method for an apparatus that supports wireless power and wired power as alternatives for providing power to a load (such as a heating element).

FIG. 1 shows a conceptual illustration 100 of an apparatus 140 capable of utilizing wired power or wireless power. The apparatus 140 may be include a heating element that can be powered using wired power or wireless power. In some examples, the apparatus 140 may be a kettle (as shown), a slow cooker, a rice cooker, a coffee machine, a toaster, a broiler, a griddle, an electric pan, or any type of appliance configured to heat a liquid or food, among other examples. Alternatively, the apparatus 140 may be a space heater, hair dryer, lantern, or any type of appliance that includes a heating element powered by electricity. For brevity, the examples in this disclosure are based on a kitchen appliance (such as a kettle). The apparatus 140 may be a hybrid power device capable of operating on either wired power or wireless power. FIG. 1 shows some examples 107 in which the apparatus 140 is operated using various power sources.

In a first example 101, the apparatus 140 may have a power line 104 configured to plug into a wired power source 118. The wired power source 118 may be an alternating current (AC) power outlet on an outlet from a direct current (DC) power outlet such as a battery bank. In the first example 101, the apparatus 140 may utilize wired power to operate the heating element.

In a second example 103, the apparatus 140 may include components for wireless power transfer. For example, the apparatus 140 may include a PRx (not shown) with a secondary coil (sometimes referred to as a power receiving coil or power transfer coil). When the apparatus 140 is placed on a wireless power transmitter 102, the PRx may receive wireless power from an electromagnetic field generated by a primary coil 110 of the wireless power transmitter 102. In the second example 103, the apparatus 140 may utilize wireless power to operate the heating element.

In a third example 105, the apparatus 140 is shown being placed on the wireless power transmitter 102 and also plugged into the wired power source 118. As described herein, a controller (not shown) of the apparatus 140 may select whether the apparatus 140 will use the wired power or the wireless power. In some implementations, the apparatus 140 will "latch" to a selected power source (wired power or wireless power) so that introduction of a different power source is ignored. For example, the apparatus 140 may stay selected to the first power source that is encountered when a temperature switch is in a first state. The first state may indicative that the temperature switch has been activated by a user and a temperature associated with the heating element is below a temperature threshold. Additionally, or alternatively, the first state may be indicative that the temperature switch is below a time limit. A selection of a particular power source may stay consistent until that power source is no longer available or until a switch reaches a second state or until a user action that removes one of the available sources or that switches off the appliance. The second state may be indicative that the temperature switch has been deactivated by the user, the temperature associated with the heating element is above the temperature threshold, the temperature switch is above the time limit, or any combination thereof. In some implementations, the temperature threshold may be associated with a target temperature of the heating element, of a liquid or food being heated by the heating element, or of a vessel or other component of the apparatus 140.

Figure 2:
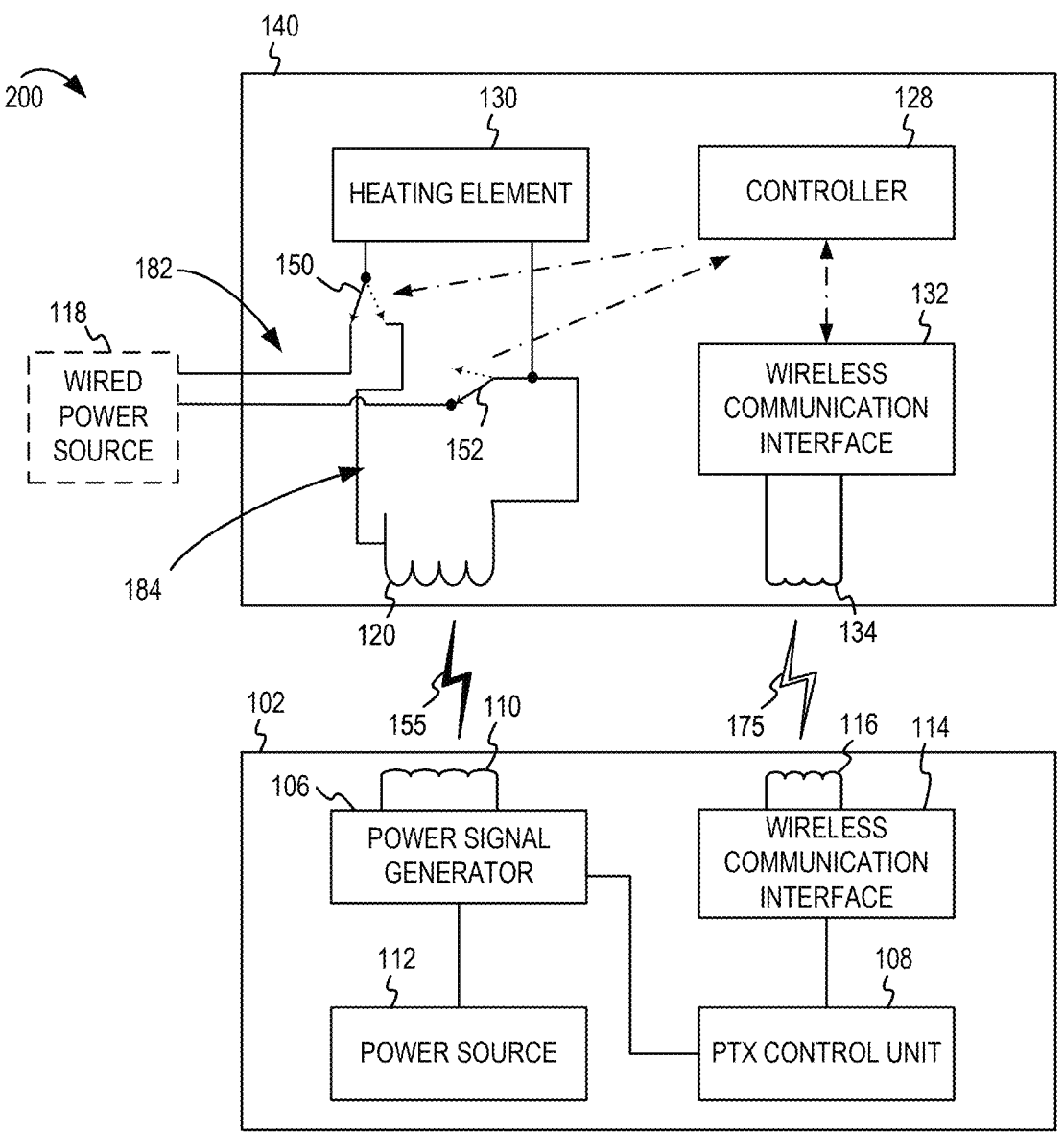
FIG. 2 shows a block diagram of an example wireless power transfer system.

FIG. 2 shows a block diagram of an example wireless power transfer system 200. The wireless power transfer system 200 may include a wireless power transmitter 102 capable of wireless power transfer to an apparatus 140 that includes components of a wireless power receiver (PRx), such as a secondary coil 120, a wireless communication interface 132, and a controller 128, described further herein.

The wireless power transmitter 102 includes a primary coil 110. The primary coil 110 may be associated with a power signal generator 106. The primary coil 110 may be a wire coil which transmits wireless power (which also may be referred to as wireless energy). The primary coil 110 may transmit wireless energy using inductive or magnetic resonant field. Together, the power signal generator and the primary coil may generate a primary magnetic field during wireless power transfer. The power signal generator 106 may include components (not shown) to provide power to the primary coil 110 causing the primary coil 110 to produce the wireless power signal 155. For example, the power signal generator 106 may include one or more switches, drivers, series capacitors, rectifiers or other components. The wireless power transmitter 102 also may include a PTx control unit 108 that controls the components of the power signal generator 106. For example, the PTx control unit 108 may determine an operating point (such as voltage. current or power) and control the power signal generator 106 according to the operating point.

In some implementations, the power signal generator 106, the PTx control unit 108 and other components (not shown) may be collectively referred to as a power transmitter circuit. Some or all of the power transmitter circuit may be embodied as an integrated circuit (IC) that implements features of this disclosure for controlling and transmitting wireless power to one or more wireless power receivers. The PTx control unit 108 may be implemented as a microcontroller, dedicated processor, integrated circuit, application specific integrated circuit (ASIC) or any other suitable electronic device.

A power source 112 may provide power to the power transmitter circuit in the wireless power transmitter 102. The power source 112 may convert AC power to DC power. For example, the power source 112 may include a converter that receives an AC power from an external power supply (such as a supply mains) and converts the AC power to a DC power used by the power signal generator 106. In some implementations, the power source may be a DC power source such as a battery bank.

The wireless power transmitter 102 may include a wireless communication interface 114 configured to communicate with a corresponding wireless communication interface 132 associated with the PRx of the apparatus 140. The wireless communication interface 114 and the wireless communication interface 132 may communicate via a wireless communication signal 175 according to a communication protocol. For example, wireless communication signal 175 may be a short range radio frequency communication using Bluetooth™ or Near Field Communication (NFC), among other examples. NFC is a technology by which data transfer occurs on a carrier frequency of 13.56 MHz. The wireless communication interface 114 also may support any suitable communication protocol. The wireless communication interface 114 may be connected to a first communication coil 116 (which may be a coil or a loop antenna, among other examples). The wireless communication interface 114 may include logic for controlling one or more switches and other components that cause transmission and reception of wireless communication signals via the first communication coil 116.

A wireless power transfer system operates in different phases, such as an idle phase, a configuration phase, a connected phase, and a power transfer phase. A technical specification may define how the wireless power transmitter 102 and a PRx (in the apparatus 140) can transition between the operating phases. For example, the wireless power transmitter 102 typically begins in the idle phase after being turned on. In the idle phase, the wireless power transmitter 102 may power the PTx control unit 108, the wireless communication interface 114, a driver, or other components of the wireless power transmitter 102 except for the primary coil 110. The primary coil 110 is only energized in the power transfer phase after a communication to do so from a controller 128 of a PRx.

In some implementations, the PTx control unit 108 may detect the presence or proximity of an apparatus 140 based on an impedance change in response to a periodic low power signal generated by the power signal generator 106 and the primary coil 110. In some implementations, the presence or proximity of the apparatus 140 may happen during a periodic pinging process of the wireless communication interface 114 in the wireless power transmitter 102. Alternatively, or additionally, the wireless power transmitter 102 may detect the presence or proximity of the apparatus 140 based on a communication via the wireless communication signal 175. For example, the wireless power transmitter 102 may periodically or continually transmit a communication or polling signal via the wireless communication signal 175. In some implementations, the wireless communication signal 175 may include a small amount of power (which may be referred to as a communication bias power or bias power) to power a wireless communication interface 132 and the controller 128 of the apparatus 140. Upon receiving a response from the apparatus 140 via the wireless communication signal 175, a handshaking process happens between the wireless power transmitter 102 and the apparatus 140. Based on the successful handshaking, the wireless power transmitter 102 and apparatus 140 transition from the idle phase to the configuration phase.

In the configuration phase, the wireless power transmitter 102 may perform or receive further communication to confirm the compatibility and power requirement of the apparatus 140. The PTx control unit 108 may control characteristics of wireless power that the wireless power transmitter 102 provides to the apparatus 140. The PTx control unit 108 may receive configuration or control information from the apparatus 140 (such as via the wireless communication interface 114). For example, in a configuration phase, the PTx control unit 108 may receive configuration information during a hand shaking process with the apparatus 140. The configuration information may include information about the apparatus 140 (such as a power rating, the manufacturer, the model, or parameters of the receiver when operating on a standard transmitter, among other examples). The PTx control unit 108 may use this information to determine at least one operating control parameter (such as frequency, duty cycle, voltage, etc.) for wireless power it provides to the apparatus 140. To configure the wireless power, the PTx control unit 108 may modify the frequency, duty cycle, voltage or any other suitable characteristic of the power signal generator 106. Once the configuration has been completed, the PTx control unit 108 may transition to a connected phase.

In the connected phase, the wireless power transmitter 102 and the apparatus 140 may exchange further communications to negotiate the parameters that govern the power transfer phase. After negotiating the parameters, the wireless power transmitter 102 may be prepared to transfer wireless power and the apparatus 140 may be prepared to receive the wireless power. However, the wireless power transmitter 102 (the PTx control unit 108) may wait for a request or command from the apparatus 140 (the controller 128) before transitioning to the power transfer phase. This may be useful, for example, when a cordless appliance is configured for use pending a user interaction. The user may initiate the power transfer phase by a user interface such as setting a target temperature or activating a temperature switch. In the power transfer phase, the wireless power transmitter 102 may transfer wireless power to the apparatus 140. The idle phase, the configuration phase, and the connected phase may be collectively referred to as pre-power phases, while the power transfer phase may be referred to as a during-power phase.

FIG. 2 shows an example apparatus 140 that includes components of a PRx (such as a secondary coil 120, a wireless communication interface 132, and a controller 128). The apparatus 140 also includes a heating element 130 and a temperature switch 152. The apparatus 140 may support traditional wired power from a wired power source 118. A wired power circuit 182 may include a power line to connect to the wired power source 118. Traditionally, the heating element 130 may connect to the wired power circuit 182. A temperature switch 152 may be part of the wired power circuit 182. The temperature switch 152 is configured to complete (also referred to as close or connect) the power circuit based on a user action. The temperature switch 152 is configured to break (also referred to as open or disconnect) the wired power circuit 182 when a temperature reaches a temperature threshold or when an operating time exceeds a time limit. For example, the temperature switch 152 may include a bimetallic element that warps when the temperature reaches a temperature thresholds. Additionally, or alternatively, the temperature switch 152 may include a timer-based switch.

As described herein, the apparatus 140 may include a power source switch 150. The power source switch 150 may be configured to switch the heating element 130 from coupling to the wired power circuit 182 or to a wireless power circuit 184. For example, the wireless power circuit 184 may include the secondary coil 120, one or more additional components such as series capacitors (not shown), rectifiers (not shown) of the PRx in the apparatus 140. When the power source switch 150 is set to couple the heating element 130 to the wireless power circuit 184 and the secondary coil 120 is aligned to the primary coil 110, the secondary coil 120 may generate an induced voltage based on a received wireless power signal 155 from the primary coil 110. The induced voltage may be referred to as wireless power since the source of the power is the secondary coil 120 of the WPT system. The wireless power can be used by the heating element 130 when the power source switch 150 is set to couple the heating element 130 to the wireless power circuit 184. In some implementations, the heating element 130 may be external to the apparatus 140 and coupled via electrical lines (not shown) from the power source switch 150. FIG. 2 shows the power source switch 150 as a single pole switch that couples one end of the heating element 130 to either the wired power circuit 182 or the wireless power circuit 184. Other types of power source switch 150 may be used with the concepts in this disclosure, including double pole switches, or a relay, among other examples. In some implementations, when operating from wireless power circuit 184, the power switch 150 also may be used as a protection switch to offer protection from any abnormalities during wireless power transfer phase. Under such conditions, the power switch 150 may be changed to disconnect the wireless circuit 184 and connect the wired circuit 182.

The apparatus 140 may include a wireless communication interface 132. The wireless communication interface 132 may contain modulation and demodulation circuits to wirelessly communicate via a second communication coil 134 (which may be a coil or a loop antenna, among other examples). Thus, the controller 128 may wirelessly communicate with the PTx control unit 108 via the wireless communication signal 175 using NFC communications or Bluetooth. In some implementations, the wireless communication interface 132 (and possibly also the controller 128) may be powered by harvesting energy from the wireless communication signal 175. For example, the wireless communication interface 132 may harvest energy from the wireless communication signal 175 via the second communication coil 134 in the form of bias power. The bias power may be enough to power the wireless communication interface 132 and, in some implementations, also may be used by other components of the apparatus 140, such as the controller 128.

The controller 128 may be configured to control the power source switch 150 to select which power source (wired power or wireless power) is used to operate the heating element 130. In some implementations, the controller 128 may use bias power from the wireless communication signal 175 to operate the power source switch 150 when the wireless power source is selected. In some implementations, the bias power may be harvested from the communication signal 175 prior to a wireless power transfer phase. In some implementations, the bias power may be harvested from one or both of the communication signal 175 or the wireless power from the secondary coil 120 during the wireless power transfer phase.

As described further herein, the controller 128 may make a selection of the wireless power source based on whether the wired power source is available or unavailable. Furthermore, the controller 128 may control the wireless power transfer based on a status of the temperature switch 152. In some implementations (as shown in FIG. 2), the wireless power circuit 184 may include the secondary coil 120 but may bypass the temperature switch 152. For example, when the heating element 130 is operated from the wireless power circuit 184, the temperature switch 152 is bypassed and the current from the wireless power circuit 184 responsible for heating in the heating element 130 does not flow though the contact made by the temperature switch 152. When the heating element 130 is operated from the wired power circuit 182, the current from the wired power source 118 responsible for heating in the heating element 130 flows through the contact made by the temperature switch 152 and the heating element 130. Thus, the temperature switch 152 may be used as part of the wired power circuit 182. However, temperature switch 152 may not be in the electrical path between the heating element 130 and the secondary coil 120 when the power source switch 150 is set to use the wireless power circuit 184. Thus, the controller 128 may obtain the status of the temperature switch 152 using a switch status sensor (described further in FIG. 3). The controller 128 may communicate messages (such as start power transfer or end power transfer messages) to the PTx control unit 108 to control whether the wireless power transfer is activated based on the status of the 152. Because the temperature switch 152 is user activated (for turning-on) and temperature-activated (for turning off) the status of the temperature switch 152 may change based on user action and temperature even when the power source switch 150 has decoupled the wired power circuit 182 from the heating element 130.

FIG. 3 shows a block diagram of an example apparatus 300 capable of utilizing wired power or wireless power. The apparatus 300 may be an example of the apparatus 140 described with reference to FIG. 1 or FIG. 2. The apparatus 300 includes the components having like numbers as those described with reference to the apparatus 140. For example, the apparatus 300 includes a heating element 130 and a temperature switch 152. A power source switch 150 may be capable of coupling the heating element 130 to a wired power circuit that connects to an external wired power source 118. The power source switch 150 also may be capable of decoupling the heating element 130 from the wired power circuit and coupling the heating element 130 to a wireless power circuit that includes a secondary coil 120. The wireless power circuit also may include a capacitor 162 and optional rectifiers (not shown). The apparatus 300 includes a controller 128, a wireless communication interface 132, and a second communication coil 134. The wireless communication interface 132 may be capable of communicating with a PTx (not shown). The wireless communication interface 132 also may include or be coupled to an energy harvester 331 that can harvest energy from wireless communication signals and provide the harvested energy as bias power 330 to operate the controller 128. The energy harvester 331 may be configured to provide harvest energy as bias power 330 to power the wireless communication interface 132, the controller 128, or both. For example, communication signals received by the communication coil 134 may provide enough energy to produce a bias power 330 for startup and initial operation of the wireless communication interface 132 and the controller 128 prior to a power transfer phase via the secondary coil 120. In some implementations, the bias power 330 also may be used to operate the power source switch 150. While the controller 128 may be initially powered by the bias power 330, the controller 128 also may be subsequently powered using power from the wireless power circuit during wireless power transfer phase. For brevity, FIG. 3 omits the circuits or components that connect the controller 128 to power obtained from the wireless power circuit during wireless power transfer phase.

The controller 128 may determine whether the wired power source 118 is available based on a sensed voltage 322 of the wired power circuit. For example, a voltage sensor 320 may obtain a voltage of the wired power circuit and provide a sensed voltage 322 (which may be referred to as "Vsense") to the controller 128. Alternatively, a circuit (not shown) may convert the Vsense to a wired power indicator (not shown) on a pin line or other input to the controller 128. The controller 128 may control the power source switch 150 based on whether the sensed voltage 322 (or wired power indicator) indicates that the wired power source 118 is available.

In some implementations, the power source switch 150 may couple the heating element 130 to the wired power circuit (as shown in FIG. 3) by default. For example, the power source switch 150 may be "normally closed" (NC) to the wired power circuit. The power source switch 150 may be "normally opened" (NO) to the wireless power circuit. The power source switch 150 may remain NC to the wired power circuit until changed by the controller 128. The controller 128 may be activated by the bias power 330 when a wireless power source is available. The controller 128 may check the sensed voltage 322 to see if the wired power source 118 is available. If the sensed voltage 322 indicates that the wired power source 118 is available, the controller 128 may refrain from changing the power source switch 150 and leave the heating element 130 coupled to the wired power circuit. Alternatively, if the sensed voltage 322 indicates that the wired power source 118 is not available (such as when the power line is not plugged into an AC outlet), the controller 128 may cause the power source switch 150 to change the connection to the wireless power circuit. This change may happen just before starting power transfer in the power transfer phase when a user turns on the appliance, such as by activating the temperature switch 152. Changing the connection may include the controller 128 sending a power source switch signal 352 to the power source switch 150. Absent the power source switch signal 352, the power source switch 150 may remain coupled to the wired power circuit. In some implementations, the power source switch signal 352 may include a power to activate the power source switch 150.

The temperature switch 152 may be a part of the wired power circuit. In some implementations, the temperature switch 152 may include a bimetallic element. The temperature switch 152 also may be referred to as a thermal switch, temperature-sensitive switch, bimetallic switch, or temperature-dependent switch, among other examples. Alternatively, or additionally, the temperature switch 152 may include a temperature sensor and an associated switch. For example, a processor (not shown) of the apparatus may receive user input indicating a target temperature. The processor may obtain temperature measurements from a sensor and control an associated switch such that the sensor and associated switch may be referred to as a temperature switch. The temperature switch is configured to deactivate power from the wired power circuit to the heating element 130 when a temperature reaches a temperature threshold. In the example in which the temperature switch 152 is a bimetallic element, the temperature switch 152 may warp causing a break (open) in the wired power circuit. In some implementations, the bimetallic switch may be a spring loaded switch that is turned on by user action. The bimetallic element in the switch may reflect a temperature change as a mechanical displacement. The bimetallic element may be composed of two strips of different metals which expand at different rates when they are heated. The disparity in heat-sensitive expansion of the two strips of metal cause the bimetallic element to warp and the switch to open. When placed in a circuit, the warping of the bimetallic switch operates as a temperature switch.

Although the temperature switch 152 may be excluded for the wireless power circuit, the controller 128 may control the wireless power transfer based on a status of the temperature switch 152. For example, the controller 128 may receive a switch status 312 from a switch status sensor 310. The switch status 312 may be an indicator, signal, or value that indicates the status of the temperature switch 152. For example, the switch status 312 may indicate whether the temperature switch is "ON" or "OFF." In one implementation, the switch status 312 may indicate whether the temperature switch 152 has reached the temperature threshold. When the controller 128 receives a switch status 312 indicating the temperature switch is "ON," the controller 128 may send a start power transfer command to the PTx (not shown) to cause the PTx to begin a wireless power transfer phase. The controller also may send a power source switch signal 352 to cause the switch 150 to couple the heating element to the wireless power circuit. The controller 128 may receive a switch status 312 indicating that the temperature switch 152 has turned "OFF". For example, the temperature switch 152 may turn OFF when a temperature has reached the temperature threshold (such as the bimetallic element has warped to a mechanical displacement) or a timer has reached a time limit. When the controller 128 receives the switch status 312 indicating the temperature switch is "OFF," the controller 128 may send an end power transfer command to the PTx via the wireless communication interface 132. The controller 128 also may send a power source switch signal 352 to cause the switch 150 to disconnect the heating element 130 from the wireless power circuit. In some implementations, the controller 128 may send the power source switch signal 352 immediately once the switch status 312 indicates the temperature switch 152 is "OFF". Alternatively, the controller 128 may wait for a predetermined time period before sending the power source switch signal 352 to the switch 150.

As a reminder, the temperature switch 152 may serve various purposes in an apparatus. For example, the temperature switch 152 may be a component to deactivate wired power to the heating element 130 when a liquid or food has reached a target temperature. Alternatively, or additionally, the temperature switch 152 may protect the heating element 130 from overheating to a dangerous level. In some implementations, the temperature switch 152 may prevent a fire or harmful condition to a user. Because the wireless power circuit does not include the temperature switch 152, the controller 128 may use the switch status sensor 310 to determine the status of the temperature switch 152. Thus, the controller 128 can control the wireless power transfer operations based on the same user controls and protective features of the temperature switch 152 that would otherwise be part of the wired power operation.

Figure 4:
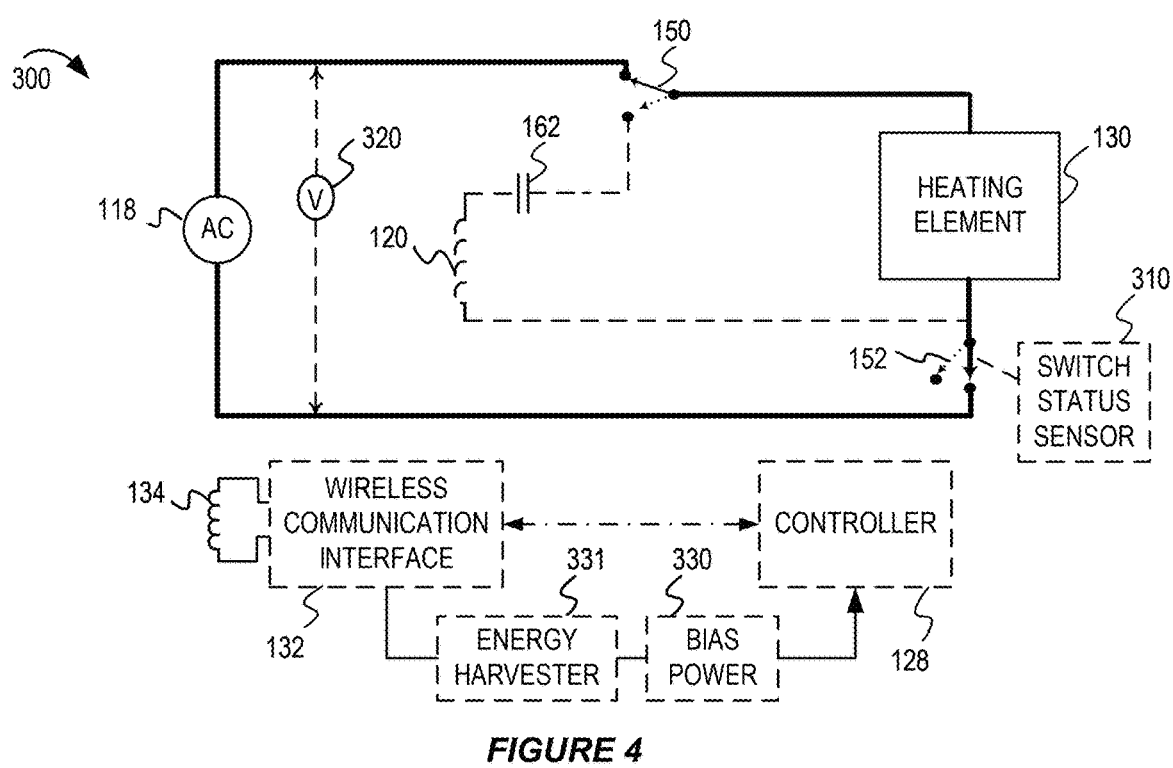
FIG. 4 shows a block diagram of the example apparatus utilizing wired power.

FIG. 4 shows a block diagram of the example apparatus 300 utilizing wired power. For example, the power source switch 150 may couple the heating element 130 to the wired power circuit (represented by bold lines in FIG. 4). The wired power circuit may include a connection to the wired power source 118. The temperature switch 152 may be included in the wired power circuit. In the example of FIG. 4, a wireless power transmitter is not present. Thus, the wireless communication interface 132 may not have a communication signal sufficient to generate a bias power 330. The wireless communication interface 132 and the controller 128 may be powered down due to the lack of bias power 330. Similarly, the wireless power circuit (including the secondary coil 120 and the capacitor 162) are shown in dashed lines as there is no wireless power transmitter present and the wireless power circuit is effectively disabled by the power source switch 150 being coupled to the wired power circuit. In some implementation, the controller 128 may be configured to also operate using bias power from the wired power circuit. In such a case, the controller 128 may prevent the power source switch 150 from connecting to the heating element 130 to the wireless power circuit when the sensed voltage 320 is above a threshold.

Figure 5:
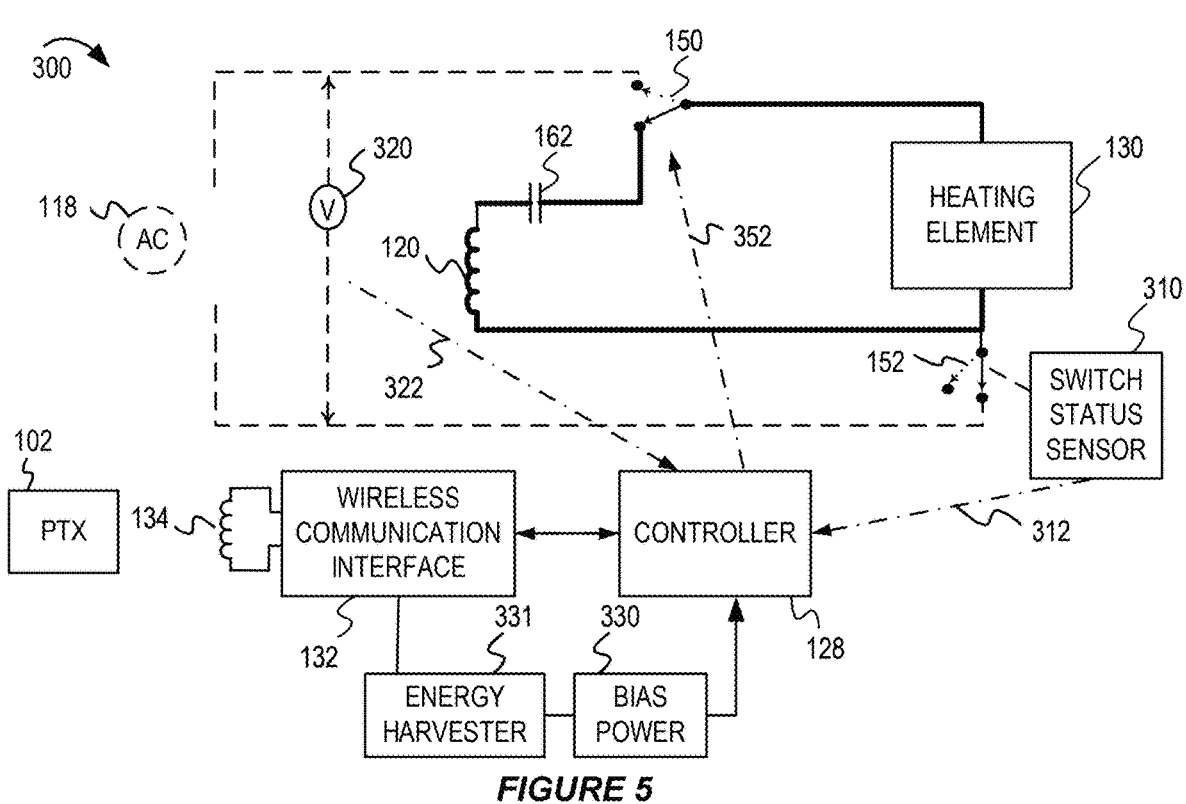
FIG. 5 shows a block diagram of the example apparatus utilizing wireless power.

FIG. 5 shows a block diagram of the example apparatus 300 utilizing wireless power. The wireless power transmitter 102 is present in proximity to the apparatus 300. The wireless communication interface 132 may receive a communication signal and harvest energy from the communication signal to generate the bias power 330, which in turn powers the controller 128. In the example of FIG. 5, the apparatus 300 is not connected to the wired power source 118. For example, the power line may be unplugged from the AC outlet or the powerline may be detached from a power port (not shown) of the apparatus 300. The controller 128 may obtain the sensed voltage 322 from the voltage sensor 320 and determine that the wired power is unavailable. The controller 128 may communicate configuration and control information to the wireless power transmitter 102 via the wireless communication interface 132. For example, the controller 128 may configure the wireless power transmitter 102 and transition through the configuration phase and connected phase as described with reference to FIG. 1. Thus, the controller 128 may prepare the wireless power circuit for receiving wireless power from a PTx. The wireless power circuit may include the secondary coil 120 and the capacitor 162.

The controller 128 may obtain the switch status 312 from the switch status sensor 310. The switch status sensor 310 is configured to detect the status of the temperature switch 152. In some implementations, the switch status sensor 310 sends a signal indicating the switch status 312 to the controller 128 when a user activates the temperature switch 152. As shown in FIG. 5, the temperature switch 152 may be in a first state. For example, the first state may occur when the temperature switch 152 is activated (such as manually pressed by a user action). In the first state, the temperature switch 152 may be associated with closing the wired power circuit when wired power source is used. However, since the wired power circuit is disconnected by the power source switch 150 in the example of FIG. 5, the temperature switch 152 and the switch status sensor 310 are being used by the controller 128 to determine a user action to activate the heating element 130, a temperature status associated with the heating element 130, or a combination thereof. In some implementations, the first state of the temperature switch 152 may be associated with the temperature being below a temperature threshold. If the wired power source 118 is unavailable, the controller 128 may send a power source switch signal 352 to cause the power source switch 150 to couple the heating element 130 to the wireless power circuit. In some implementations, the controller 128 may send the power source switch signal 352 when the controller 128 determines that the wired power source 118 is unavailable (based on the sensed voltage 322 being zero or negligible). Alternatively, or additionally, the controller 128 may send the power source switch signal 352 when the temperature switch 152 is activated (based on the switch status 312).

The controller 128 may determine that the switch status 312 indicates that the temperature switch 152 has been activated and may send a power transfer command to the wireless power transmitter 102 to activate wireless power transfer. The wireless power transmitter 102 may transmit wireless power to the secondary coil 120 to operate the heating element 130. At some point, the temperature switch 152 may reach the temperature threshold and change to a second status. For example, the temperature switch 152 may be a bimetallic element that warps when the temperature reaches the temperature threshold. When the switch status 312 obtained by the controller 128 indicates that the temperature switch 152 has reached the second state, the controller 128 may communicate an end power transfer command to the wireless power transmitter 102 via the wireless communication interface 132. Additionally, the controller 128 may send a power source switch signal 352 to cause the power source switch 150 to decouple the heating element 130 from the wireless power circuit.

Figure 6:
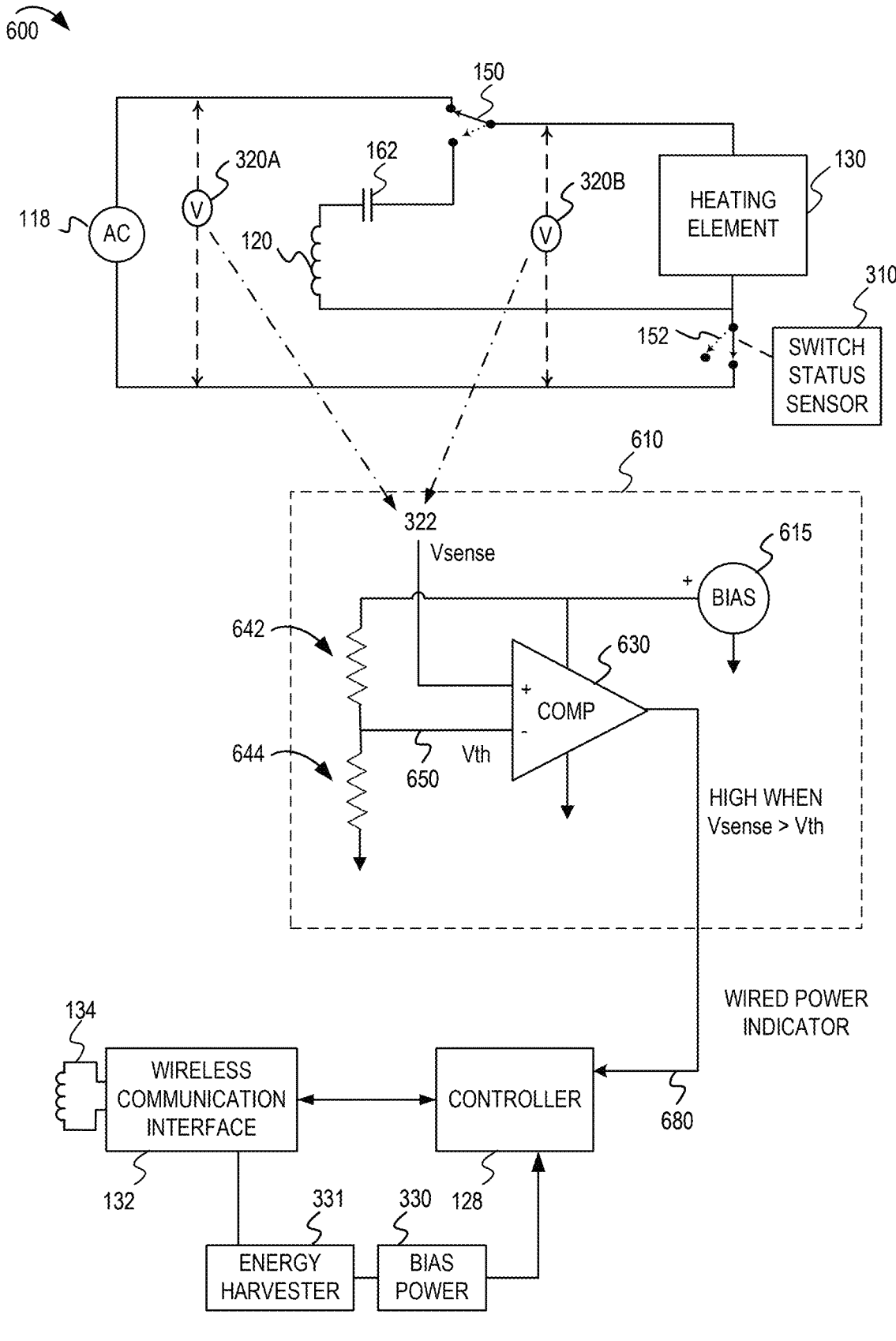
FIG. 6 shows a block diagram of an example apparatus capable of detecting whether the wired power is available or unavailable.

FIG. 6 shows a block diagram of an example apparatus 600 capable of detecting whether the wired power is available or unavailable. The apparatus 600 may be an example of any one of the apparatuses 140 and 300 described with reference to FIGS. 1-5, respectively. The apparatus 600 includes a Vsense circuit 610 for determining a wired power indicator 680. The Vsense circuit 610 may be an analog circuit that can convert a sensed voltage 322 from a voltage sensor (such as voltage sensor 320A or 320B) to a wired power indicator 680. In some implementations, the voltage sensors 320A and 320B may include circuitry, such as resistors, rectifiers, capacitors or other electronics (not shown), that may provide a scaled root mean square (RMS), peak or average value of their sensed voltage. The voltage sensor (shown as voltage sensor 320A) may be in the wired power circuit on the wired power source side of the power source switch 150. Alternatively, the voltage sensor (shown as voltage sensor 320B) maybe in the wired power circuit on the heating element 130 side of the power source switch 150. In both cases, the voltage sensor 320A or 320B may represent a source of input for a sensed voltage 322 to the Vsense circuit 610. The Vsense circuit 610 may include a comparator 630 operated by a bias power 615. In some implementations, the bias power 615 may be connected to the bias power 330 harvested by the wireless communication interface 132. The comparator 630 may compare the sensed voltage 322 with a voltage threshold 650. In some implementations, the voltage threshold 650 may be generated by an analog circuit that includes the bias power 615 moderated by a pair of resistors 642 and 644 or other components (not shown). The comparator 630 may compare the sensed voltage 322 ("Vsense") with the voltage threshold 650 ("Vth") to generate the wired power indicator 680. For example, the wired power indicator 680 may have a first voltage ("HIGH") when the Vsense is greater than the Vth. The wired power indicator 680 may have a second voltage ("LOW") when the Vsense is less than the Vth. As an example, the HIGH voltage may be approximately 5 Volts, while the LOW voltage may be 0 Volts. The controller 128 may utilize the wired power indicator 680 on a pin line or other input. As described elsewhere herein, the controller 128 may be configured to disable wireless power transfer when the wired power indicator 680 indicates wired power is available (shown as "HIGH" value for the wired power indicator 680). Conversely, when the wired power is unavailable ("LOW" value for the wired power indicator 680), the controller 128 may cause the power source switch 150 to change to the wireless power circuit before entering power transfer.

FIG. 7A shows a block diagram of an example apparatus 700 and an example switch status sensor. The apparatus 700 may be an example of any one of the apparatuses 140, 300, or 600 described with reference to FIGS. 1-6, respectively. The apparatus 700 includes a switch status circuit 710 for determining a switch status 312 of the temperature switch 152. The switch status circuit 710 may be an example of the switch status sensor 310 described with reference to FIGS. 3-6. The switch status circuit 710 may be an analog circuit that can generate the switch status 312. For example, the switch status circuit 710 may include a bias voltage 715 coupled to a first leg of the temperature switch 152. In some implementations, the bias voltage 715 may be associated to the bias power 330 harvested by the energy harvester 331. The switch status circuit 710 may include a resistor 744 or other components. The voltage across the resistor 744 conveys the switch status (Vsw) 312 to the controller 128. For example, when the temperature switch is turned ON, the voltage across the resistor 744 equal the bias voltage 715 or "HIGH." When the temperature switch 152 is turned OFF, the voltage across the resistor 744 becomes zero or "LOW." It should be understood that the example switch status circuit 710 described with reference to FIG. 7A is one possible realization of an analog circuit that can generate a switch status 312 based on the status of the temperature switch 152. For example, a switch status circuit may have a comparator (not shown). Advantageously, the example switch status circuit 710 illustrated in FIG. 7A requires relatively fewer components compared to other types of sensors or circuits. Although not shown, the circuit may have additional protections and voltage limiters to prevent the AC voltage from the wired source 118 from driving the electronics involving the bias voltage 715, the controller 312 and other components beyond their safety limits.

Figure 7B:
FIG. 7B shows a block diagram of another example apparatus and another example switch status sensor.

FIG. 7B shows a block diagram of another example apparatus 701 and another example switch status sensor 711. The apparatus 701 may be an example of any one of the apparatuses 140, 300, or 600 described with reference to FIGS. 1-6, respectively. The apparatus 701 includes a switch status circuit 711 for determining a switch status 312 of the temperature switch 152. The switch status circuit 711 may be an example of the switch status sensor 310 described with reference to FIGS. 3-6. The switch status circuit 711 may be an analog circuit that can generate the switch status 312. The switch status sensor 711 may obtain bias voltage 715 associated with the bias power 330 obtained by the energy harvester 331.

The switch status sensor 711 has resistors 774 and 775 of high resistance values (of the order of few hundreds of kiloohms) and voltage limiters 746 and 747. When the temperature switch 152 is turned OFF, the bias voltage 715 appears at the switch status signal (Vsw) 312 as a "HIGH." When the temperature switch 152 is turned ON, part of the bias voltage appears across the resistor 774 and hence switch status (Vsw) 312 is "LOW." It may be noticed that the status logic here is different from the one used in FIG. 7A.

Figure 8:
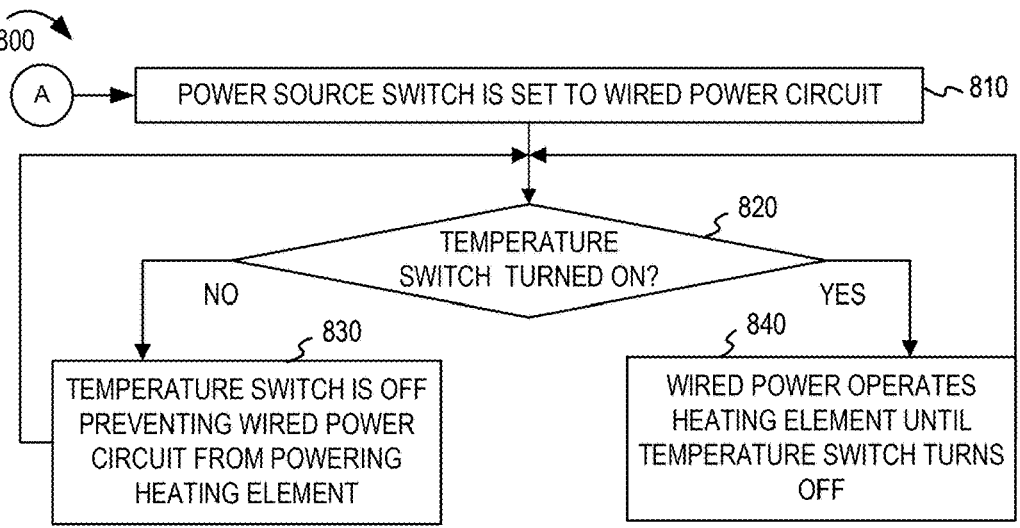
FIG. 8 shows a flowchart diagram of an example process associated with wired power in accordance with some implementations.

FIG. 8 shows a flowchart diagram of an example process 800 associated with wired power in accordance with some implementations. The process 800 may describe operation of an apparatus, such as any one of the apparatuses 140, 300, 600, or 700 described with reference to FIGS. 1-7B, respectively. At block 810, the power source switch may be set to the wired power circuit. For example, the power source switch may default to the wired power circuit as a NC connection in the absence of a power source switch signal. In the example process 800, a PTx is not near the apparatus, so the components of the PRx are not relevant. At block 820, the process 800 may determine whether a temperature switch (such as a bimetallic switch) is turned on. For example, the temperature switch may be a mechanical knob operated by a user of the apparatus to turn on the heating function of the apparatus. The temperature switch may close the wired power circuit to connect the wired power to the heating element. Thus, if the temperature switch is turned on, the process 800 proceeds to block 840. At block 840, the wired power operates the heating element until the temperature switch turns off (such as due to the temperature warping the bimetallic elements of the bimetallic switch). Alternatively, if the temperature switch is turned off at block 820, the process 800 proceeds to block 830. At block 830, no power is delivered to the heating element because the temperature switch opens (breaks) the wired power circuit. The wired power circuit being open prevents the wired power circuit from providing power to the heating element.

Figure 9:
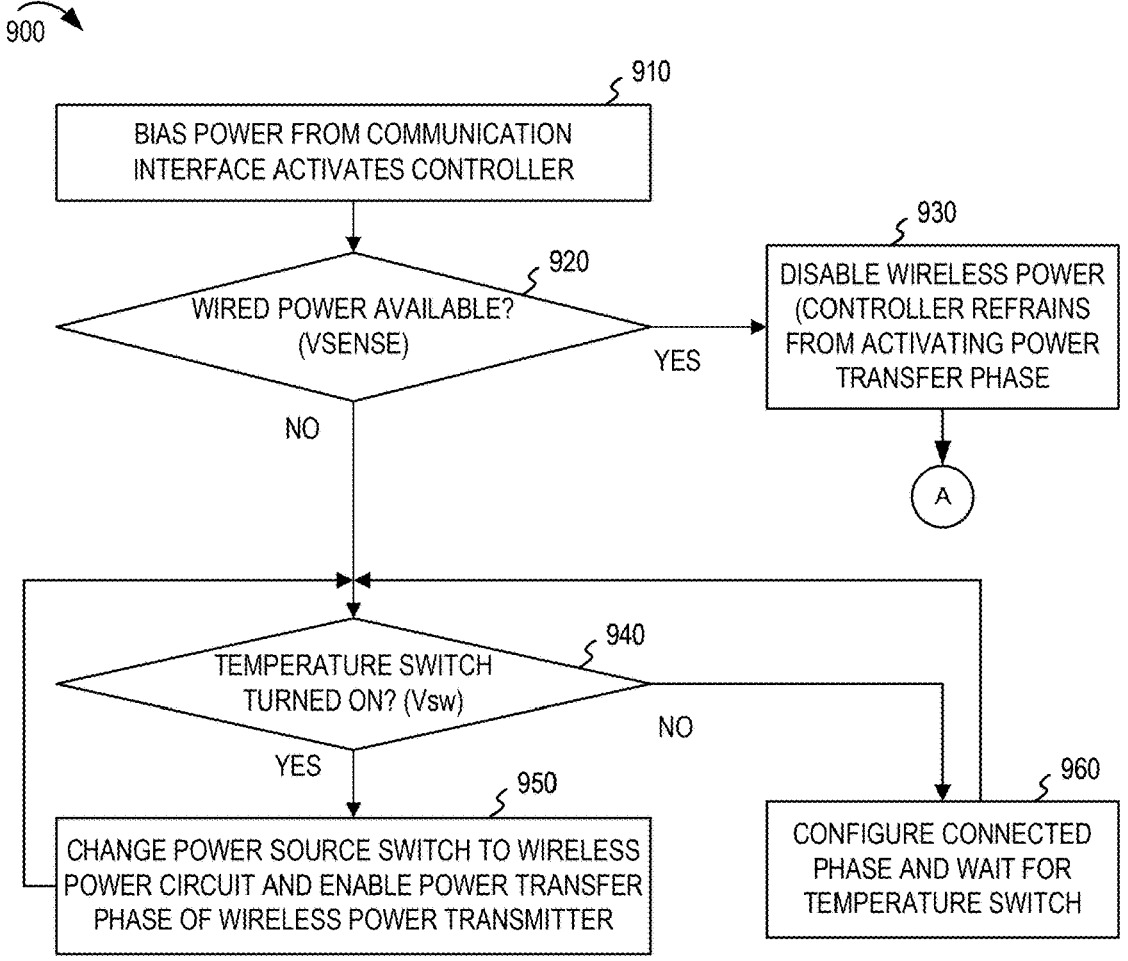
FIG. 9 shows a flowchart diagram of an example process associated with wireless power in accordance with some implementations.

FIG. 9 shows a flowchart diagram of an example process associated with wireless power in accordance with some implementations. The process 900 may describe operation of an apparatus, such as any one of the apparatuses 140, 300, 600, 700, or 701 described with reference to FIGS. 1-7B, respectively. At block 910, a bias power harvested by the communication interface is used to power the controller. The controller may obtain a Vsense or wired power indicator (based on the Vsense) based on a sensed voltage of the wired power circuit. At block 920, the controller may determine whether the wired power is available based on the Vsense or wired power indicator. If wired power is available, the process 900 proceeds to block 930. At block 930, the controller may disable wireless power function of the wireless power circuit. For example, the controller may refrain from activating a power transfer phase of the PTx. The process 900 may then continue with wired power operation as described with reference to FIG. 8 (reference A).

At block 920, if wired power is unavailable, the process 900 proceeds to block 940. At block 940, the controller may determine a state of the temperature switch. For example, the controller may obtain a switch status associated with a temperature switch. As described with reference to FIG. 8, the temperature switch may be a mechanical knob operated by a user of the apparatus to turn on the heating function of the apparatus. Although the temperature switch may not be part of the wireless power circuit, the controller can determine the status of the temperature switch using a switch status sensor (such as the switch status circuit 710 described with reference to FIG. 7A or the switch status circuit 711 described with reference to FIG. 7B). If the switch status indicates the temperature switch is turned on, the process 900 proceeds to block 950. Alternatively, if the switch status is turned off, the process 900 proceeds to block 960.

At block 950, the controller may change the power source switch to couple the heating element to the wireless power circuit and enable the wireless power transfer phase of the PTx. Note that the operations of block 950 may be dependent on several conditions: wired power is unavailable, wireless power transfer is available, and the temperature switch is turned on to activate the heating function of the apparatus.

At block 960, if the temperature switch is turned off, the controller may configure the wireless power transfer system for the connected phase and wait for the temperature switch to be turned on before activating the power transfer phase. In some implementations, the controller also may cause the power source switch to decouple the heating element from wireless power circuit. Thus, the heating element may be coupled to the wireless power circuit only when the wireless power circuit is in power transfer phase.

Figure 10:
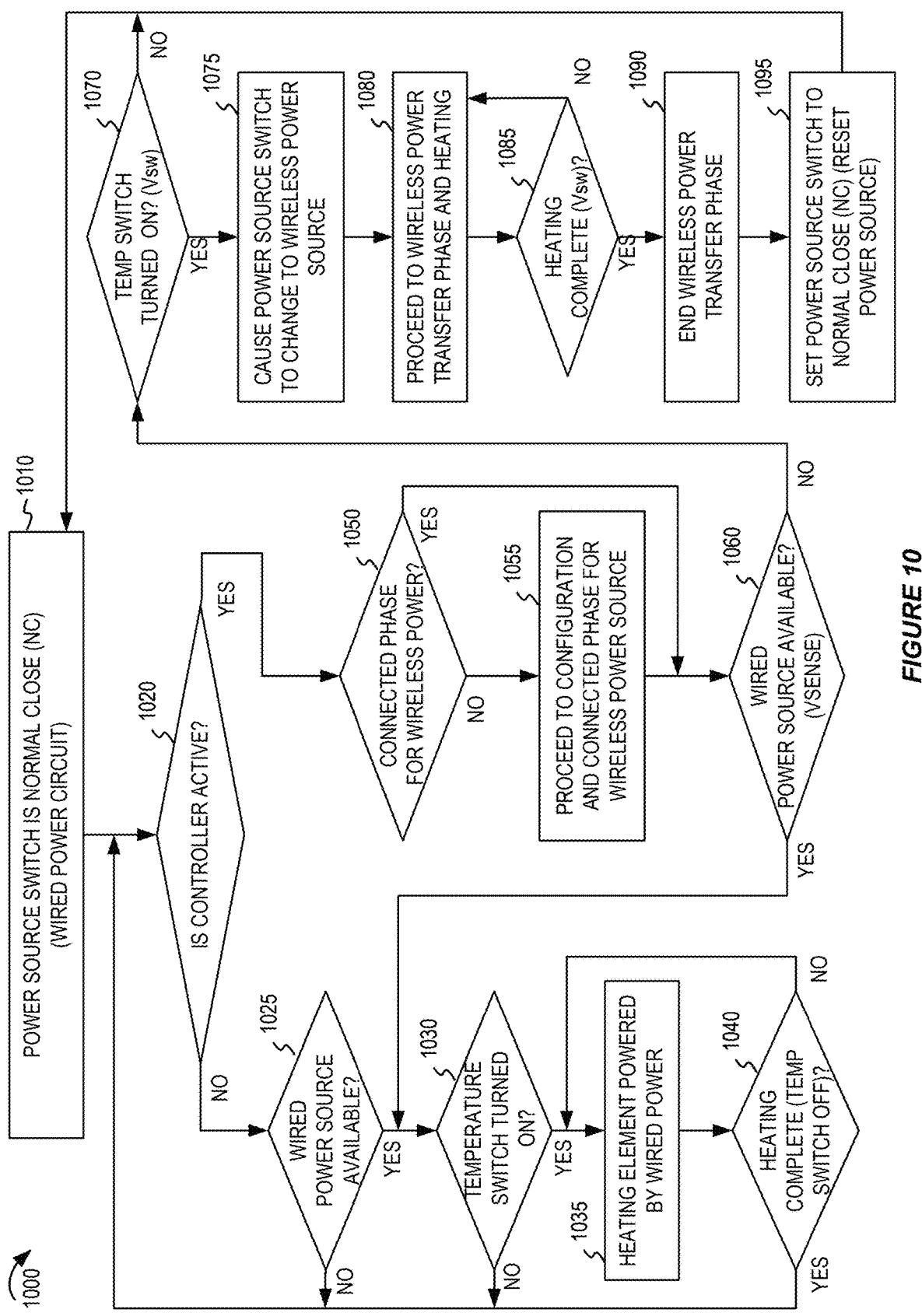
FIG. 10 shows a flowchart diagram of an example process for controlling wired power or wireless power in accordance with some implementations.

FIG. 10 shows a flowchart diagram of an example process for controlling wired power or wireless power in accordance with some implementations. The process 1000 may describe operation of an apparatus, such as any one of the apparatuses 140, 300, 600, 700, or 701 described with reference to FIGS. 1-7B, respectively. The process 1000 combines several conditions and associated operations based on availability of wired power or wireless power transfer.

At block 1010, the power source switch may be NC to the wired power circuit. At block 1020, the process 1000 may depend on whether the controller is active. In some implementations, because the controller is operated by bias power harvested from a communication signal of a PTx, the controller is active when the PTx is present. Otherwise, when there is no PTx present, the controller may be inactive. At block 1020, if the controller is active, the process 1000 proceeds to block 1050. If the controller is inactive, the process 1000 proceeds to block 1025.

Beginning with the scenario when the controller is inactive (such as no wireless power source is available), operations associated with wired power are executed. At block 1025, the process 1000 may depend on whether the wired power source is available. If the wired power source is unavailable, the process 1000 returns to block 1020. This scenario may occur when the apparatus is not plugged in nor placed in proximity to a PTx. At block 1025 if the wired power source is available, the process 1000 proceeds to block 1030. At block 1030, the process 1000 may depend on whether the temperature switch is turned on (such as by a user action. If the temperature switch is not turned on, the process 1000 returns to block 1020. Otherwise, if the temperature switch is turned on, the process 1000 proceeds to block 1035. At block 1035, the heating element is powered by the wired power. At block 1040, the heating is complete when the temperature switch turns off. When heating is complete, the process 1000 returns to block 1020. Otherwise, the process returns to block 1035 to continue heating. The operations of blocks 1035 and 1040 will continue until the heating is complete.

In the scenario when the controller is active (such as the wireless power source is available at block 1020), the process 1000 proceeds to block 1050. At block 1050, the controller of the apparatus may determine whether the PTx is in the connected phase. If the PTx is not in the connected phase the process 1000 proceeds to block 1055 at which the controller proceeds with configuration and connected phase operations to prepare the PTx for pre-power operations. From block 1055, after connected phase, the process proceeds to block 1060. At block 1050, if the PTx is already in connected phase, the process 1000 proceeds to block 1060.

At block 1060, the controller may determine whether the wired power source is available. For example, the controller may obtain a sensed voltage or a wired power indicator associated with a voltage sensor in the wired power circuit. If the wired power source is available, the process 1000 proceeds to block 1030 to continue with wired power operations. Note that the PTx and controller may remain in connected phase. If the wired power source is unplugged before the temperature switch is turned on, the process 1000 may return to blocks 1020, 1050, and 1060. From block 1060, when the wired power source is unavailable, the process 1000 proceeds to block 1070 to perform operations associated with wireless power.

At block 1070, the controller may determine whether the temperature switch is turned on. For example, the controller may obtain a switch status from a switch status sensor. If the temperature switch is off, the process 1000 returns to block 1010 (or, alternatively, may return to block 1060 or 1020). At block 1070, if the temperature switch is turned on, the process 1000 proceeds to block 1075.

At block 1075, the controller may cause the power source switch to switch to the wireless power source. At block 1080, the controller may proceed to the wireless power transfer phase. For example, the controller may communicate a start power transfer command to the PTx. The wireless power transfer energizes the wireless power circuit and causes the heating element to begin heating. Although not shown, during the power transfer phase, in some implementations, the bias power may also be drawn from the wireless power circuit. At block 1085, the controller may determine whether heating is complete. For example, the controller may obtain a switch status of the temperature switch. If the switch status of the temperature switch indicates the temperature has reached the temperature threshold, the controller may determine that the heating is complete. If heating is not complete, the process 1000 may return to block 1080 and heating continues. If the heating is complete, the process may proceed to block 1090.

At block 1090, the controller may end the wireless power transfer phase. For example, the controller may communicate an end power transfer message to the PTx. At block 1095, the apparatus may cause the power source switch to reset to the NC position such that the heating element is coupled to the wired power. The process 1000 may return to block 1010.

FIG. 11 shows a flowchart diagram of an example process in accordance with some implementations. The process 1100 may describe operation of an apparatus, such as any one of the apparatuses 140, 300, 600, 700, or 701 described with reference to FIGS. 1-7B, respectively.

At block 1110, the apparatus may couple a load to a wired power circuit associated with wired power via a power source switch configured to selectively couple the load to the wired power circuit or a wireless power circuit associated with wireless power from a wireless power transmitter.

At block 1120, the apparatus may cause, by a controller, a change in the power source switch to couple the load to the wireless power circuit based on a determination that the wired power is unavailable and the wireless power transmitter is available to transmit the wireless power. In some implementations, the controller may cause the change after a temperature switch has been turned on (such as by user action). The power source switch may be configured to normally couple the heating element to the wired power circuit in the absence of the user action to turn on the temperature switch.

At block 1130, the apparatus may control, by the controller via the wireless communication interface, a wireless power transfer state of the wireless power transmitter when the load is coupled to the wireless power circuit. For example, the apparatus may send a request to the wireless power transmitter to proceed to the power transfer phase.

Figure 12:
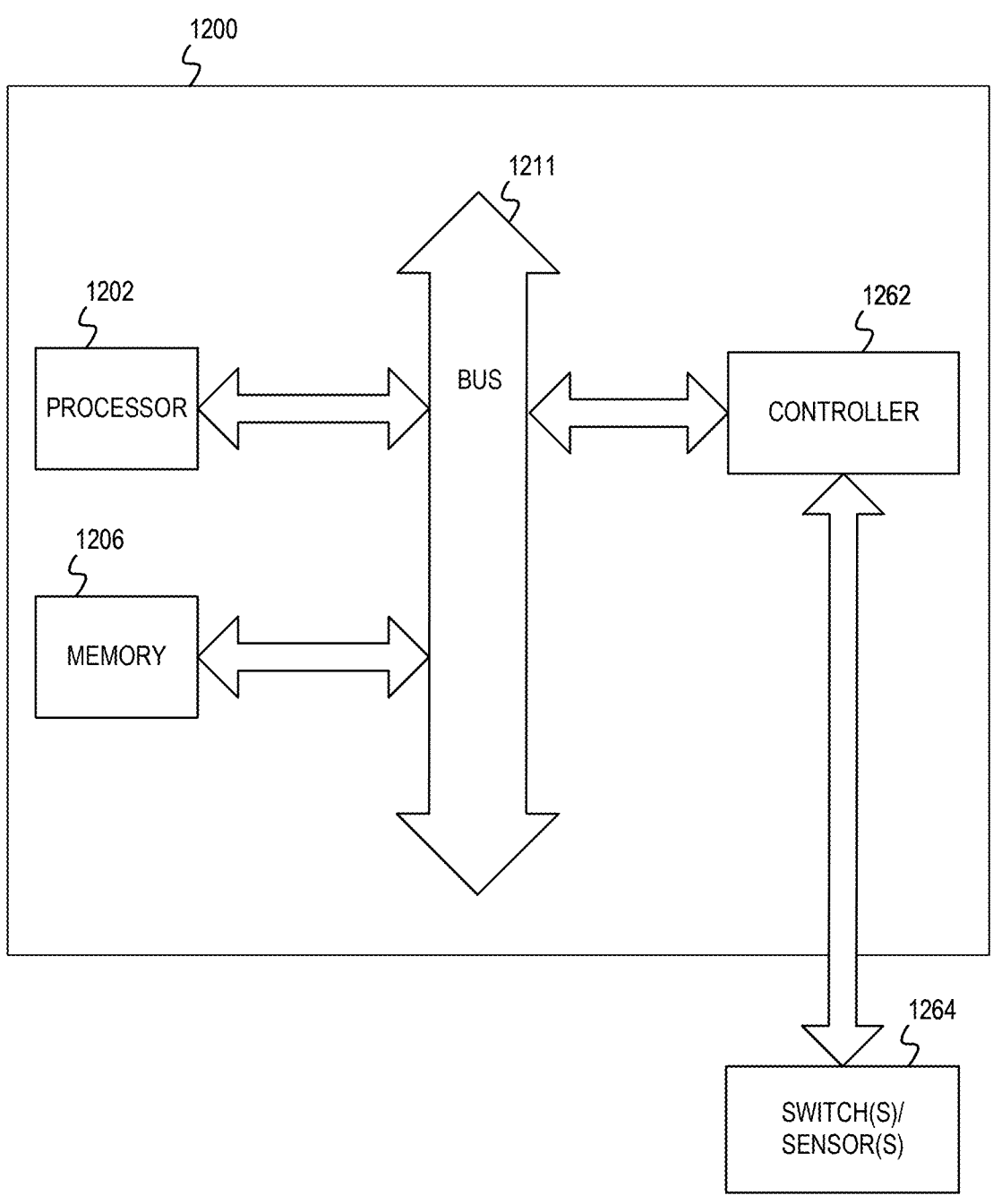
FIG. 12 shows a block diagram of an example apparatus.

FIG. 12 shows a block diagram of an example apparatus 1200. In some implementations, the apparatus 1200 may be a wireless power receiver (PRx). In some implementations, the apparatus 1200 may be an example of any one of the apparatuses 140, 300, 600, 700, or 701 described with reference to FIGS. 1-7B, respectively. The apparatus 1200 may include a processor 1202 (possibly including multiple processors, multiple cores, multiple nodes, or implementing multi-threading, etc.). The apparatus 1200 also can include a memory 1206. The memory 1206 may be system memory or any one or more of the possible realizations of computer-readable media described herein. The apparatus 1200 also can include a bus 1211 (such as PCI, ISA, PCI-Express, HyperTransport®, InfiniBand®, NuBus®, AHB, AXI, etc.).

The apparatus 1200 may include one or more controller(s) 1262 configured to control wired power or wireless power operations of the apparatus 1200. For example, the controller(s) 1262 may be an example of the controller 128 described herein. The apparatus 1200 may include one or more switches and/or sensors 1264. Examples of the one or more switches and/or sensors 1264 may include the power source switch 150, the voltage sensor 320, the switch status sensor 310, the Vsense circuit 610, the switch status circuit 710, or any combination thereof. In some implementations, the controller(s) 1262 can be distributed within the processor 1202, the memory 1206, and the bus 1211. The controller(s) 1262 may perform some or all of the operations described herein. For example, the controller(s) 1262 may implement any of the operations described with reference to FIGS. 1-7B or the features of processes 800, 900, 1000 or 1100 described with reference to FIGS. 8-11.

The memory 1206 can include computer instructions executable by the processor 1202 or the controller(s) 1262 to implement the functionality of the implementations described with reference to FIGS. 1-11. Any one of these functionalities may be partially (or entirely) implemented in hardware or on the processor 1202. For example, the functionality may be implemented with an application specific integrated circuit, in logic implemented in the processor 1202, in a co-processor on a peripheral device or card, etc. Further, realizations may include fewer or additional components not illustrated in FIG. 12. The processor 1202, the memory 1206, and the controller(s) 1262 may be coupled to the bus 1211. Although illustrated as being coupled to the bus 1211, the memory 1206 may be coupled to the processor 1202.

FIGS. 1-12 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the implementation option described herein. Alternatively, or in addition to the other examples described herein, examples include any combination of the following implementation options (enumerated as clauses for clarity).

Clause 1. An apparatus, including: a power source switch configured to selectively couple a load to a wired power circuit associated with wired power or a wireless power circuit configured to receive wireless power from a wireless power transmitter; and a controller configured to: cause the power source switch to couple the load to the wireless power circuit based on a determination that the wired power is unavailable and the wireless power transmitter is available to transmit the wireless power, and control, via a communication to the wireless power transmitter, a wireless power transfer state of the wireless power transmitter when the load is coupled to the wireless power circuit.

Clause 2. The apparatus of clause 1, where the power source switch includes one or more switches that are in a first position until changed by the controller to a second position, the first position configured to couple the load to the wired power circuit, and the second position configured to couple the load to the wireless power circuit.

Clause 3. The apparatus of clause 2, where the first position of the one or more switches is normally closed (NC) to couple the load to the wired power circuit and normally open (NO) to decouple the load from the wireless power circuit.

Clause 4. The apparatus of any one of clauses 1-3, where the controller is configured to: determine that the wireless power transmitter is available to transmit the wireless power based on a communication received from the wireless power transmitter, and determine whether the wired power is available or unavailable based on a voltage associated with the wired power circuit.

Clause 5. The apparatus of clause 4, further including: a voltage sensor configured to sense the voltage associated with the wired power circuit, where the controller is configured to: determine that the wired power is available when the voltage associated with the wired power circuit is above a voltage threshold, and determine that the wired power is unavailable when the voltage associated with the wired power circuit is below the voltage threshold.

Clause 6. The apparatus of any one of clauses 1-5, further including: a wireless communication interface configured to communicate with the wireless power transmitter, where the controller is configured to communicate with the wireless power transmitter via the wireless communication interface to control the wireless power transfer state of the wireless power transmitter.

Clause 7. The apparatus of clause 6, further including: an energy harvester that is integrated with or operatively coupled to the wireless communication interface, the energy harvester configured to harvest a bias power from communication signals received by a communication coil of the wireless communication interface, and where the controller is at least initially powered by the bias power.

Clause 8. The apparatus of any one of clauses 1-7, further including: a temperature switch associated with the load, where the load includes a heating element, and where the controller is configured to control the wireless power transfer state of the wireless power transmitter based, at least in part, on a status of the temperature switch.

Clause 9. The apparatus of clause 8, where the temperature switch includes a bimetallic element in the wired power circuit, and where the bimetallic element opens the wired power circuit when a temperature associated with the heating element reaches a temperature threshold.

Clause 10. The apparatus of any one of clauses 8-9, where the wireless power circuit couples to the heating element such that the wireless power circuit bypasses the temperature switch.

Clause 11. The apparatus of any one of clauses 8-10, further including: a switch status sensor configured to detect the status of the temperature switch, the status being either a first state or a second state, where the controller is configured to: receive the status from the switch status sensor, and cause the wireless power transmitter to transmit the wireless power when the status is the first state; and cause the wireless power transmitter to cease transmission of the wireless power when the status of the temperature switch is the second state.

Clause 12. The apparatus of clause 11, where: the first state is indicative that the temperature switch has been activated by a user and a temperature associated with the heating element is below a temperature threshold, and the second state is indicative that the temperature switch has been deactivated by the user or the temperature associated with the heating element is above the temperature threshold.

Clause 13. The apparatus of any one of clauses 1-12, where the apparatus is a kettle or a slow cooker, the apparatus further including: a vessel configured to hold liquid or food, where the load includes a heating element configured to heat the liquid or the food using the wired power from the wired power circuit or the wireless power from the wireless power circuit until the liquid or the food reaches a temperature threshold, where the controller is configured to control, via the communication to the wireless power transmitter, the wireless power transfer state of the wireless power transmitter when the load is coupled to the wireless power circuit based, at least in part, on a status of a temperature switch associated with the temperature threshold.

Clause 14. A method for controlling an apparatus, including: coupling a load to a wired power circuit associated with wired power via a power source switch configured to selectively couple the load to the wired power circuit or a wireless power circuit associated with wireless power from a wireless power transmitter; causing, by a controller, a change in the power source switch to couple the load to the wireless power circuit based on a determination that the wired power is unavailable and the wireless power transmitter is available to transmit the wireless power; and controlling, by the controller via a wireless communication interface, a wireless power transfer state of the wireless power transmitter when the load is coupled to the wireless power circuit.

Clause 15. The method of clause 14, where the power source switch includes one or more switches that are in a first position until changed by the controller to a second position, the first position configured to couple the load to the wired power circuit, and the second position configured to couple the load to the wireless power circuit.

Clause 16. The method of clause 15, where the first position of the one or more switches is normally closed (NC) to couple the load to the wired power circuit and normally open (NO) to decouple the load from the wireless power circuit.

Clause 17. The method of any one of clauses 14-16, further including: determining that the wireless power transmitter is available to transmit the wireless power based on a communication received from the wireless power transmitter; and determining, by the controller, whether the wired power is available or unavailable based on a voltage associated with the wired power circuit.

Clause 18. The method of any one of clauses 14-17, further including: sensing, by a voltage sensor, the voltage associated with the wired power circuit, determining that the wired power is available when the voltage associated with the wired power circuit is above a voltage threshold, and determining that the wired power is unavailable when the voltage associated with the wired power circuit is below the voltage threshold.

Clause 19. The method of any one of clauses 17-18, further including: determining that the wired power is available based on the voltage associated with the wired power circuit; refraining from causing the change in the power source switch such that the load remains coupled to the wired power circuit; and preventing the wireless power transmitter from transmitting the wireless power.

Clause 20. The method of any one of clauses 14-19, further including: harvesting, by an energy harvester that is integrated with or operatively coupled to a wireless communication interface of the apparatus, a bias power from communication signals received by a communication coil of the wireless communication interface; and powering the controller using the bias power.

Clause 21. The method of clause 20, where the controller is at least initially powered by the bias power, and where the communication signals are indicative that the wireless power transmitter is available to transmit the wireless power.

Clause 22. The method of clause 20, further including: determining a status of a temperature switch associated with the load, where the load includes a heating element; and controlling the wireless power transfer state of the wireless power transmitter based, at least in part, on the status of the temperature switch.

Clause 23. The method of clause 22, where the temperature switch includes a bimetallic element in the wired power circuit, and where the bimetallic element opens the wired power circuit when a temperature associated with the heating element reaches a temperature threshold.

Clause 24. The method of any one of clauses 22-23, where the wireless power circuit couples to the heating element such that the wireless power circuit bypasses the temperature switch.

Clause 25. The method of any one of clauses 23-24, further including: detecting, by a switch status sensor, the status of the temperature switch, the status being either a first state or a second state; causing the wireless power transmitter to transmit the wireless power when the status is the first state; and causing the wireless power transmitter to cease transmission of the wireless power when the status of the temperature switch is the second state.

Clause 26. The method of clause 25, where: the first state is indicative that the temperature switch has been activated by a user and a temperature associated with the heating element is below a temperature threshold, and the second state is indicative that the temperature switch has been deactivated by the user or the temperature associated with the heating element is above the temperature threshold.

The figures, operations, and components described herein are examples meant to aid in understanding example implementations and should not be used to limit the potential implementations or limit the scope of the claims. Some implementations may perform additional operations, fewer operations, operations in parallel or in a different order, and some operations differently.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. An apparatus, comprising:
a power source switch configured to selectively couple a load to
a wired power circuit associated with wired power or
a wireless power circuit configured to receive wireless power from a wireless power transmitter;
a wireless communication interface configured to communicate with the wireless power transmitter to control a wireless power transfer state of the wireless power transmitter;
an energy harvester that is integrated with or operatively coupled to the wireless communication interface, the energy harvester configured to harvest a bias power from communication signals received by a communication coil of the wireless communication interface; and
a controller configured to:
cause the power source switch to couple the load to the wireless power circuit based on a determination that the wired power is unavailable and the wireless power transmitter is available to transmit the wireless power,
control, via a first communication to the wireless power transmitter, a wireless power transfer state of the wireless power transmitter when the load is coupled to the wireless power circuit,
wherein the controller is at least initially powered by the bias power.

2. The apparatus of claim 1, wherein the power source switch includes one or more switches that are in a first position until changed by the controller to a second position, the first position configured to couple the load to the wired power circuit, and the second position configured to couple the load to the wireless power circuit.

3. The apparatus of claim 2, wherein the first position of the one or more switches is normally closed (NC) to couple the load to the wired power circuit and normally open (NO) to decouple the load from the wireless power circuit.

4. The apparatus of claim 1, wherein the controller is configured to:
determine that the wireless power transmitter is available to transmit the wireless power based on a second communication received from the wireless power transmitter, and
determine whether the wired power is available or unavailable based on a voltage associated with the wired power circuit.

5. The apparatus of claim 4, further comprising:
a voltage sensor configured to sense the voltage associated with the wired power circuit, wherein the controller is configured to:
determine that the wired power is available when the voltage associated with the wired power circuit is above a voltage threshold, and
determine that the wired power is unavailable when the voltage associated with the wired power circuit is below the voltage threshold.

6. An apparatus, comprising:
a power source switch configured to selectively couple a load to
a wired power circuit associated with a wired power or a wireless power circuit configured to receive a wireless power from a wireless power transmitter;
a temperature switch associated with the load, wherein the load includes a heating element; and
a controller configured to:
cause the power source switch to couple the load to the wireless power circuit based on a determination that the wired power is unavailable and the wireless power transmitter is available to transmit the wireless power, and
control, via a first communication to the wireless power transmitter, a wireless power transfer state of the wireless power transmitter when the load is coupled to the wireless power circuit, wherein control is based, at least in part, on a status of the temperature switch,
wherein the controller is configured to control the wireless power transfer state of the wireless power transmitter based, at least in part, on a status of the temperature switch.

7. The apparatus of claim 6, wherein the temperature switch includes a bimetallic element in the wired power circuit, and wherein the bimetallic element opens the wired power circuit when a temperature associated with the heating element reaches a temperature threshold.

8. The apparatus of claim 6, wherein the wireless power circuit couples to the heating element such that the wireless power circuit bypasses the temperature switch.

9. The apparatus of claim 6, further comprising:
a switch status sensor configured to detect the status of the temperature switch, the status being either a first state or a second state,
wherein the controller is configured to:
receive the status from the switch status sensor, and
cause the wireless power transmitter to transmit the wireless power when the status is the first state; and
cause the wireless power transmitter to cease transmission of the wireless power when the status of the temperature switch is the second state.

10. The apparatus of claim 9, wherein:
the first state is indicative that the temperature switch has been activated by a user and a temperature associated with the heating element is below a temperature threshold, and
the second state is indicative that the temperature switch has been deactivated by the user or the temperature associated with the heating element is above the temperature threshold.

11. The apparatus of claim 6, wherein the apparatus is a kettle or a slow cooker, the apparatus further comprising:
a vessel configured to hold liquid or food, wherein the load includes a heating element configured to heat the liquid or the food using the wired power from the wired power circuit or the wireless power from the wireless power circuit until the liquid or the food reaches a temperature threshold,
wherein the controller is configured to control, via the first communication to the wireless power transmitter, the wireless power transfer state of the wireless power transmitter when the load is coupled to the wireless power circuit based, at least in part, on a status of a temperature switch associated with the temperature threshold.

12. A method for controlling an apparatus, comprising:
coupling a load via a power source switch configured to selectively couple the load to
a wired power circuit associated with wired power or a wireless power circuit associated with wireless power from a wireless power transmitter;

causing, by a controller, a change in the power source switch to couple the load to the wireless power circuit based on a determination that the wired power is unavailable and the wireless power transmitter is available to transmit the wireless power;

controlling, by the controller via a wireless communication interface, a wireless power transfer state of the wireless power transmitter when the load is coupled to the wireless power circuit;

harvesting, by an energy harvester that is integrated with or operatively coupled to the wireless communication interface, a bias power from communication signals received by the wireless communication interface; and providing the bias power to the controller, wherein the controller is at least initially powered by the bias power.

13. The method of claim 12, wherein the power source switch includes one or more switches that are in a first position until changed by the controller to a second position, the first position configured to couple the load to the wired power circuit, and the second position configured to couple the load to the wireless power circuit.

14. The method of claim 13, wherein the first position of the one or more switches is normally closed (NC) to couple the load to the wired power circuit and normally open (NO) to decouple the load from the wireless power circuit.

15. The method of claim 12, further comprising:

determining that the wireless power transmitter is available to transmit the wireless power based on a communication received from the wireless power transmitter; and determining, by the controller, whether the wired power is available or unavailable based on a voltage associated with the wired power circuit.

16. The method of claim 15, further comprising:

sensing, by a voltage sensor, the voltage associated with the wired power circuit, determining that the wired power is available when the voltage associated with the wired power circuit is above a voltage threshold, and determining that the wired power is unavailable when the voltage associated with the wired power circuit is below the voltage threshold.

17. The method of claim 15, further comprising:

determining that the wired power is available based on the voltage associated with the wired power circuit;

refraining from causing the change in the power source switch such that the load remains coupled to the wired power circuit; and preventing the wireless power transmitter from transmitting the wireless power.

18. The method of claim 12, wherein the communication signals are indicative that the wireless power transmitter is available to transmit the wireless power.

19. A method for controlling an apparatus, comprising:

coupling a load via a power source switch configured to selectively couple the load to a wired power circuit associated with wired power or a wireless power circuit associated with wireless power from a wireless power transmitter;

causing, by a controller, a change in the power source switch to couple the load to the wireless power circuit based on a determination that the wired power is unavailable and the wireless power transmitter is available to transmit the wireless power;

controlling, by the controller via a wireless communication interface, a wireless power transfer state of the wireless power transmitter when the load is coupled to the wireless power circuit;

determining a status of a temperature switch associated with the load, wherein the load includes a heating element; and controlling the wireless power transfer state of the wireless power transmitter based, at least in part, on the status of the temperature switch.

20. The method of claim 19, wherein the temperature switch includes a bimetallic element in the wired power circuit, and wherein the bimetallic element opens the wired power circuit when a temperature associated with the heating element reaches a temperature threshold.

21. The method of claim 19, wherein the wireless power circuit couples to the heating element such that the wireless power circuit bypasses the temperature switch.

22. The method of claim 19, further comprising:

detecting, by a switch status sensor, the status of the temperature switch, the status being either a first state or a second state;

causing the wireless power transmitter to transmit the wireless power when the status is the first state; and causing the wireless power transmitter to cease transmission of the wireless power when the status of the temperature switch is the second state.

23. The method of claim 22, wherein:

the first state is indicative that the temperature switch has been activated by a user and a temperature associated with the heating element is below a temperature threshold, and the second state is indicative that the temperature switch has been deactivated by the user or the temperature associated with the heating element is above the temperature threshold.

* * * * *